United States Patent
Sheldon et al.

(10) Patent No.: US 8,873,028 B2
(45) Date of Patent: Oct. 28, 2014

(54) NON-DESTRUCTIVE STRESS PROFILE DETERMINATION IN CHEMICALLY TEMPERED GLASS

(75) Inventors: Eli Sheldon, Florence, MA (US);
Edward Byun, Westborough, MA (US);
Michael Lintz, Needham, MA (US);
Jayesh Gorasia, Kuala Lumpur (MY);
Raphael Cherney, Omaha, NE (US)

(73) Assignee: Apple Inc., Cupertino, CA (US)

( * ) Notice: Subject to any disclaimer, the term of this patent is extended or adjusted under 35 U.S.C. 154(b) by 146 days.

(21) Appl. No.: 13/172,709

(22) Filed: Jun. 29, 2011

(65) Prior Publication Data

US 2012/0050747 A1 Mar. 1, 2012

Related U.S. Application Data

(60) Provisional application No. 61/377,384, filed on Aug. 26, 2010.

(51) Int. Cl.

| G01B 9/02 | (2006.01) |
|---|---|
| G01B 11/02 | (2006.01) |
| G01L 1/24 | (2006.01) |
| G01L 5/00 | (2006.01) |
| C03C 21/00 | (2006.01) |

(52) U.S. Cl.
CPC ........ *G01B 9/02027* (2013.01); *G01B 2290/70* (2013.01); *G01B 2290/45* (2013.01); *G01L 5/0047* (2013.01); *G01L 1/24* (2013.01); *G01B 9/02014* (2013.01); *C03C 21/002* (2013.01)
USPC ........................... 356/35.5; 356/479; 356/497

(58) Field of Classification Search
USPC ........................................ 356/35.5, 479, 497
See application file for complete search history.

(56) References Cited

U.S. PATENT DOCUMENTS

| 3,415,637 A | 12/1968 | Glynn |
| 3,498,773 A | 3/1970 | Due et al. |
| 3,558,415 A | 1/1971 | Rieser et al. |
| 3,607,172 A | 9/1971 | Poole et al. |
| 3,652,244 A | 3/1972 | Plumat |
| 3,753,840 A | 8/1973 | Plumat |
| 3,798,013 A | 3/1974 | Inoue et al. |
| 3,843,472 A | 10/1974 | Toussaint et al. |
| 3,857,689 A | 12/1974 | Koizumi et al. |
| 4,012,131 A * | 3/1977 | Krohn et al. ............. 351/159.01 |

(Continued)

FOREIGN PATENT DOCUMENTS

| AT | 283 630 B | 10/1970 |
| CN | 1277090 A | 12/2000 |

(Continued)

OTHER PUBLICATIONS

Aben, Hillar; Laboratory of Photoelasticity, Institute of Cybernetics at TTU; www.ioc.ee/res/photo.html, Oct. 5, 2000.*
Forooghian, Farzin et al.; Investigative Ophthalmology & Visual Science; Oct. 2008, vol. 49, No. 10.*
Christopher E. Saxer et al. "High-speed fiber-based polarization-sensitive optical coherence tomography of in vivo human skin"; Optics Letters, vol. 25, No. 18; Sep. 15, 2000; pp. 1355-1357.*

(Continued)

*Primary Examiner* — Michael A Lyons
*Assistant Examiner* — Hina F Ayub

(57) ABSTRACT

Apparatus, systems and methods for improving strength of thin cover glass for electronic devices are disclosed. Optical coherence tomography analysis may reveal fine details of a residual stress profile within chemically strengthened cover glass. One or more parameters of chemical strengthening treatments may be adjusted, based upon the analysis of the residual stress profile.

23 Claims, 12 Drawing Sheets

(56) References Cited

U.S. PATENT DOCUMENTS

| | | | |
|---|---|---|---|
| 4,015,045 A | 3/1977 | Rinehart | |
| 4,119,760 A | 10/1978 | Rinehart | |
| 4,156,755 A | 5/1979 | Rinehart | |
| 4,165,228 A | 8/1979 | Ebata et al. | |
| 4,178,082 A | 12/1979 | Ganswein et al. | |
| 4,212,919 A | 7/1980 | Hoda | |
| 4,346,601 A | 8/1982 | France | |
| 4,353,649 A | 10/1982 | Kishii | |
| 4,425,810 A | 1/1984 | Simon et al. | |
| 4,646,722 A | 3/1987 | Silverstein et al. | |
| 4,842,629 A | 6/1989 | Clemens et al. | |
| 4,844,724 A | 7/1989 | Sakai et al. | |
| 4,849,002 A | 7/1989 | Rapp | |
| 4,872,896 A | 10/1989 | LaCourse et al. | |
| 4,937,129 A | 6/1990 | Yamazaki | |
| 4,957,364 A | 9/1990 | Chesler | |
| 4,959,548 A | 9/1990 | Kupperman et al. | |
| 4,983,197 A | 1/1991 | Froning et al. | |
| 4,986,130 A | 1/1991 | Engelhaupt et al. | |
| 5,104,435 A | 4/1992 | Oikawa et al. | |
| 5,157,746 A | 10/1992 | Tobita et al. | |
| 5,160,523 A | 11/1992 | Honkanen et al. | |
| 5,254,149 A | 10/1993 | Hashemi et al. | |
| 5,269,888 A | 12/1993 | Morasca | |
| 5,281,303 A | 1/1994 | Beguin et al. | |
| 5,369,267 A | 11/1994 | Johnson et al. | |
| 5,437,193 A | 8/1995 | Schleitweiler et al. | |
| 5,445,871 A | 8/1995 | Murase et al. | |
| 5,525,138 A | 6/1996 | Hashemi et al. | |
| 5,625,154 A | 4/1997 | Matsuhiro et al. | |
| 5,733,622 A | 3/1998 | Starcke et al. | |
| 5,780,371 A | 7/1998 | Rifqi et al. | |
| 5,930,047 A | 7/1999 | Gunz et al. | |
| 5,953,094 A | 9/1999 | Matsuoka et al. | |
| 6,393,180 B1 | 5/2002 | Farries et al. | |
| 6,429,840 B1 | 8/2002 | Sekiguchi | |
| 6,437,867 B2 * | 8/2002 | Zeylikovich et al. | 356/497 |
| 6,516,634 B1 | 2/2003 | Green et al. | |
| 6,521,862 B1 | 2/2003 | Brannon | |
| 6,538,739 B1 * | 3/2003 | Visuri et al. | 356/394 |
| 6,621,542 B1 | 9/2003 | Aruga | |
| 6,769,274 B2 | 8/2004 | Cho et al. | |
| 6,810,688 B1 | 11/2004 | Duisit et al. | |
| 6,936,741 B2 | 8/2005 | Munnig et al. | |
| 6,996,324 B2 | 2/2006 | Hiraka et al. | |
| 7,012,700 B2 * | 3/2006 | De Groot et al. | 356/512 |
| 7,013,709 B2 | 3/2006 | Hajduk et al. | |
| 7,070,837 B2 | 7/2006 | Ross | |
| 7,461,564 B2 | 12/2008 | Glaesemann | |
| 7,583,368 B1 * | 9/2009 | Simpson et al. | 356/35.5 |
| 7,728,985 B2 * | 6/2010 | Feldchtein et al. | 356/497 |
| 7,810,355 B2 | 10/2010 | Feinstein et al. | |
| 7,872,644 B2 | 1/2011 | Hong et al. | |
| 8,110,268 B2 | 2/2012 | Hegemier et al. | |
| 8,111,248 B2 | 2/2012 | Lee et al. | |
| 8,312,743 B2 | 11/2012 | Pun et al. | |
| 8,393,175 B2 | 3/2013 | Kohli et al. | |
| 2002/0035853 A1 | 3/2002 | Brown et al. | |
| 2002/0157199 A1 | 10/2002 | Piltingsrud | |
| 2002/0179864 A1 * | 12/2002 | Fielden et al. | 250/559.27 |
| 2003/0024274 A1 | 2/2003 | Cho et al. | |
| 2003/0025917 A1 * | 2/2003 | Suhami | 356/601 |
| 2004/0051944 A1 | 3/2004 | Stark | |
| 2004/0163414 A1 | 8/2004 | Eto et al. | |
| 2005/0193772 A1 | 9/2005 | Davidson et al. | |
| 2006/0055936 A1 * | 3/2006 | Yun et al. | 356/479 |
| 2006/0070694 A1 | 4/2006 | Rehfeld et al. | |
| 2006/0227331 A1 * | 10/2006 | Vollmer et al. | 356/483 |
| 2006/0238695 A1 | 10/2006 | Miyamoto | |
| 2007/0013822 A1 | 1/2007 | Kawata et al. | |
| 2007/0029519 A1 | 2/2007 | Kikuyama et al. | |
| 2007/0030436 A1 | 2/2007 | Sasabayashi | |
| 2007/0058160 A1 * | 3/2007 | Huang et al. | 356/124 |
| 2007/0236618 A1 | 10/2007 | Magg et al. | |
| 2008/0074028 A1 | 3/2008 | Ozolins et al. | |
| 2008/0094716 A1 | 4/2008 | Ushiro et al. | |
| 2008/0180683 A1 * | 7/2008 | Kemp | 356/491 |
| 2008/0202167 A1 | 8/2008 | Cavallaro et al. | |
| 2008/0243321 A1 | 10/2008 | Walser et al. | |
| 2008/0261057 A1 | 10/2008 | Slobodin | |
| 2008/0264176 A1 | 10/2008 | Bertrand et al. | |
| 2008/0286548 A1 | 11/2008 | Ellison et al. | |
| 2009/0046240 A1 | 2/2009 | Bolton | |
| 2009/0067141 A1 | 3/2009 | Dabov et al. | |
| 2009/0096937 A1 | 4/2009 | Bauer et al. | |
| 2009/0153729 A1 | 6/2009 | Hiltunen et al. | |
| 2009/0197048 A1 | 8/2009 | Amin et al. | |
| 2009/0202808 A1 | 8/2009 | Glaesemann et al. | |
| 2009/0220761 A1 * | 9/2009 | Dejneka et al. | 428/220 |
| 2009/0257189 A1 | 10/2009 | Wang et al. | |
| 2009/0294420 A1 | 12/2009 | Abramov et al. | |
| 2009/0296102 A1 * | 12/2009 | Tamura | 356/512 |
| 2009/0324899 A1 | 12/2009 | Feinstein et al. | |
| 2009/0324939 A1 | 12/2009 | Feinstein et al. | |
| 2010/0009154 A1 | 1/2010 | Allan et al. | |
| 2010/0028607 A1 | 2/2010 | Lee et al. | |
| 2010/0053632 A1 * | 3/2010 | Alphonse et al. | 356/479 |
| 2010/0154992 A1 | 6/2010 | Feinstein et al. | |
| 2010/0179044 A1 | 7/2010 | Sellier et al. | |
| 2010/0206008 A1 | 8/2010 | Harvey et al. | |
| 2010/0216514 A1 | 8/2010 | Smoyer et al. | |
| 2010/0224767 A1 | 9/2010 | Kawano et al. | |
| 2010/0265188 A1 | 10/2010 | Chang et al. | |
| 2010/0279067 A1 | 11/2010 | Sabia et al. | |
| 2010/0285275 A1 | 11/2010 | Baca et al. | |
| 2010/0296027 A1 | 11/2010 | Matsuhira et al. | |
| 2010/0315570 A1 | 12/2010 | Mathew et al. | |
| 2010/0321305 A1 | 12/2010 | Chang et al. | |
| 2011/0003619 A1 | 1/2011 | Bolton | |
| 2011/0012873 A1 | 1/2011 | Prest et al. | |
| 2011/0019123 A1 | 1/2011 | Prest et al. | |
| 2011/0019354 A1 * | 1/2011 | Prest et al. | 361/679.21 |
| 2011/0067447 A1 | 3/2011 | Zadesky et al. | |
| 2011/0072856 A1 | 3/2011 | Davidson et al. | |
| 2011/0075153 A1 * | 3/2011 | Hogan | 356/491 |
| 2011/0102346 A1 | 5/2011 | Orsley et al. | |
| 2011/0159321 A1 | 6/2011 | Eda et al. | |
| 2011/0164372 A1 | 7/2011 | McClure et al. | |
| 2011/0199687 A1 | 8/2011 | Sellier et al. | |
| 2011/0255250 A1 | 10/2011 | Dinh | |
| 2011/0300908 A1 | 12/2011 | Grespan et al. | |
| 2012/0033227 A1 * | 2/2012 | Bower et al. | 356/479 |
| 2012/0099113 A1 * | 4/2012 | de Boer et al. | 356/491 |
| 2012/0105400 A1 | 5/2012 | Mathew et al. | |
| 2012/0135195 A1 | 5/2012 | Glaesemann et al. | |
| 2012/0136259 A1 * | 5/2012 | Milner et al. | 600/478 |
| 2012/0151760 A1 | 6/2012 | Steijner | |
| 2012/0202040 A1 | 8/2012 | Barefoot et al. | |
| 2012/0227399 A1 | 9/2012 | Yeates | |
| 2012/0236477 A1 | 9/2012 | Weber et al. | |
| 2012/0236526 A1 | 9/2012 | Weber et al. | |
| 2012/0281381 A1 | 11/2012 | Sanford | |
| 2013/0182259 A1 * | 7/2013 | Brezinski et al. | 356/456 |

FOREIGN PATENT DOCUMENTS

| | | |
|---|---|---|
| CN | 1322339 A | 11/2011 |
| DE | 17 71 268 A1 | 12/1971 |
| DE | 32 12 612 A1 | 10/1983 |
| DE | 103 22 350 A1 | 12/2004 |
| EP | 2025556 A2 | 2/2009 |
| EP | 2036867 A1 | 3/2009 |
| EP | 2075237 | 7/2009 |
| EP | 2196870 A1 | 6/2010 |
| GB | 1 346 747 | 2/1974 |
| JP | 55031944 | 3/1980 |
| JP | 55-95645 | 7/1980 |
| JP | 55 144450 | 11/1980 |
| JP | 59037451 | 2/1984 |
| JP | 6066696 | 10/1986 |
| JP | 63 060129 | 3/1988 |
| JP | 63222234 | 9/1988 |
| JP | 6242260 A | 9/1994 |
| JP | 2008-001590 | 1/2008 |

(56) References Cited

FOREIGN PATENT DOCUMENTS

| JP | 2008-066126 A | 3/2008 |
| JP | A 2008-216938 | 9/2008 |
| JP | A 2008-306149 | 12/2008 |
| JP | 2010 064943 | 3/2010 |
| JP | 2010/195600 | 9/2010 |
| JP | 2011-527661 | 11/2011 |
| WO | WO 00/47529 A | 8/2000 |
| WO | WO 02/42838 A1 | 5/2002 |
| WO | WO 2004/106253 A | 12/2004 |
| WO | WO 2008/044694 A | 4/2008 |
| WO | WO 2008/143999 A1 | 11/2008 |
| WO | WO 2009/099615 | 8/2009 |
| WO | WO 2009125133 A2 | 10/2009 |
| WO | WO 2010/005578 | 1/2010 |
| WO | WO 2010/014163 | 2/2010 |
| WO | WO 2010/019829 A1 | 2/2010 |
| WO | WO 2012/015960 | 2/2012 |
| WO | WO 2012/106280 | 8/2012 |

OTHER PUBLICATIONS

Chemically Strengthened Glass, Wikipedia, Apr. 19, 2009, http://en/wikipedia.org/w/index.php?title=Chemically_strengthened_glass&oldid=284794988.

Wikipedia: "Iphone 4", www.wikipedia.org, retrieved Oct. 31, 2011, 15 pgs.

"Toward Making Smart Phone Touch-Screens More Glare and Smudge Resistant", e! Science News, http://eciencenews.com/articles/2009/08/19toward.making.smart.phone.touch.screens.more.glare.and.smudge.resistant, Aug. 19, 2009, 1 pg.

Arun K. Varshneya, Chemical Strengthening of Glass: Lessons Learned and Yet to be Learned, International Journal of Applied Glass Science, 2010, 1, 2, pp. 131-142.

"iPhone 4", Wikipedia, Jan. 4, 2012, 17 pgs.

Mehrl et al., "Designer's Noticebook: Proximity Detection IR LED and Optical Crosstalk", http://ams.com/eng/content/view/download/145137, Aug. 1, 2011, 5 pages.

* cited by examiner

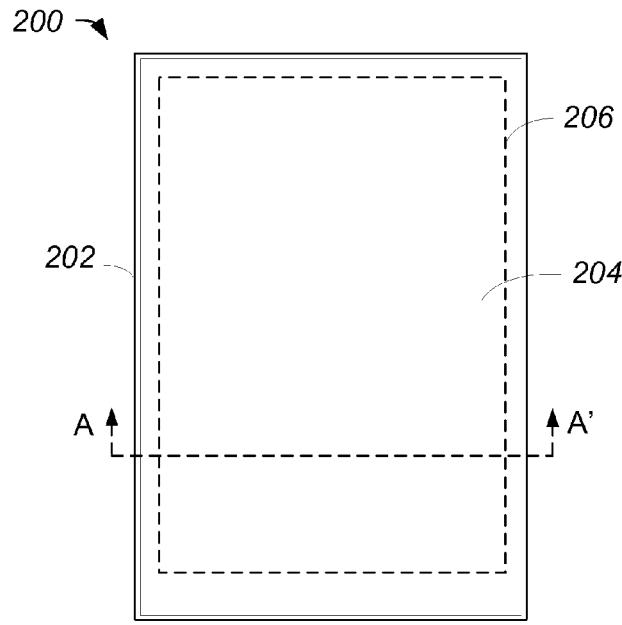
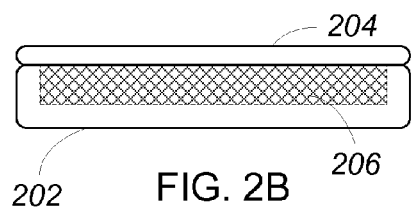
FIG. 2A  FIG. 2B
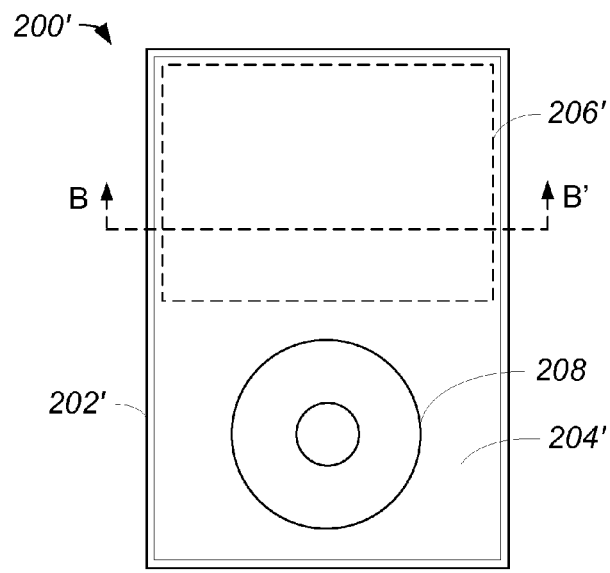
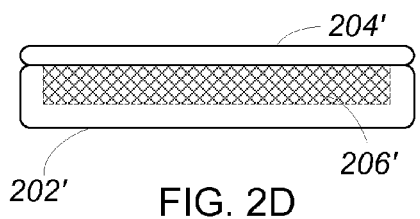
FIG. 2C  FIG. 2D

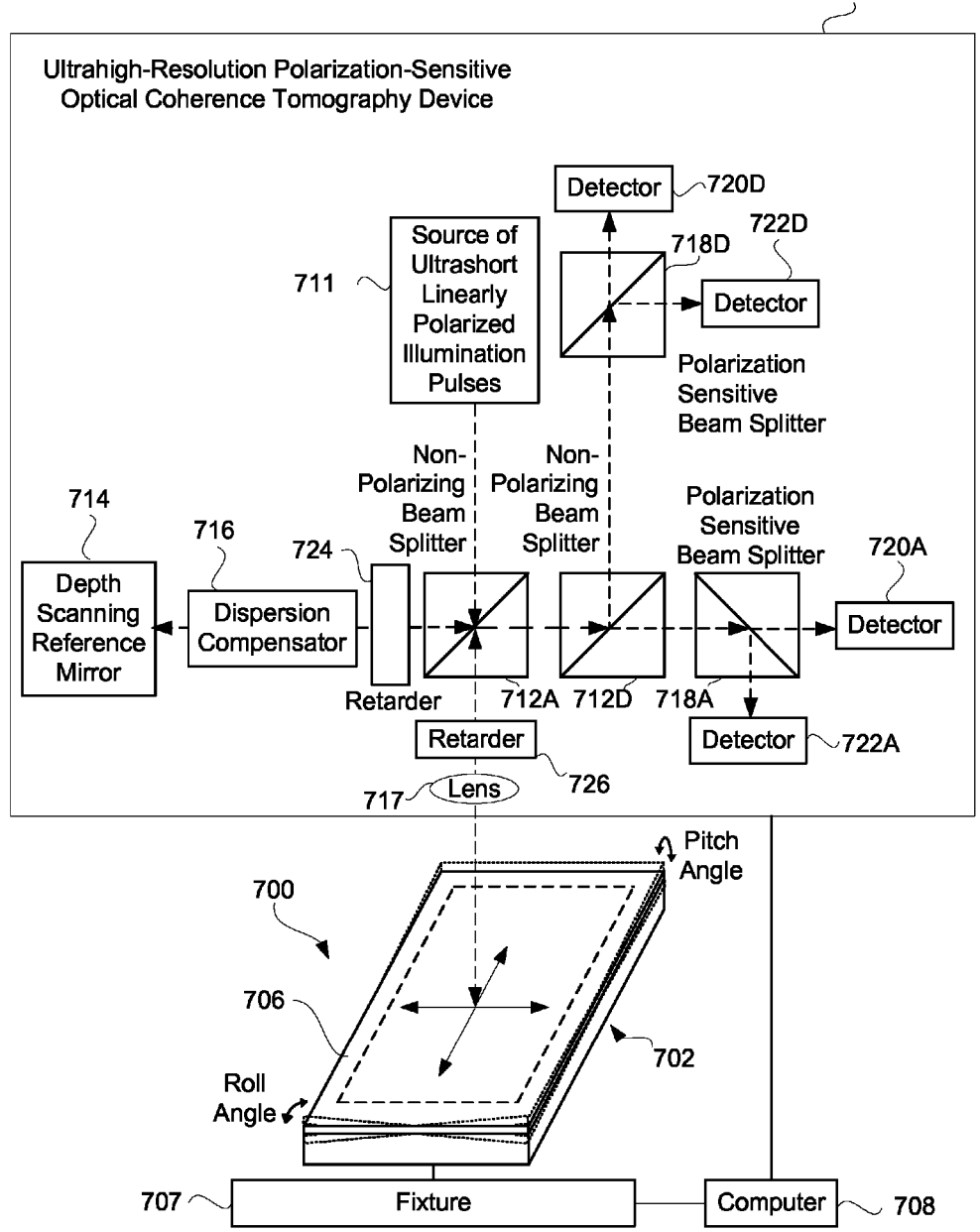

NON-DESTRUCTIVE STRESS PROFILE DETERMINATION IN CHEMICALLY TEMPERED GLASS

CROSS-REFERENCE TO RELATED APPLICATION

This application claim priority benefit to U.S. Provisional Patent Application No. 61/377,384, filed Aug. 26, 2010 and entitled "Non-Destructive Stress Profile Determination in Chemically Tempered Glass," which is hereby incorporated herein by reference.

BACKGROUND OF THE INVENTION

Conventionally, small form factor devices, such as handheld electronic devices, have a display arrangement that includes various layers. The various layers include at least a display technology layer, and may additionally include a sensing arrangement and/or a cover window disposed over the display technology layer. By way of example, the display technology layer may include or pertain to a Liquid Crystal Display (LCD) that includes a Liquid Crystal Module (LCM). The LCM generally includes an upper glass sheet and a lower glass sheet that sandwich a liquid crystal layer therebetween. The sensing arrangement may be a touch sensing arrangement such as those used to create a touch screen. For example, a capacitive sensing touch screen can include substantially transparent sensing points or nodes dispersed about a sheet of glass (or plastic). In addition, the cover window, which is typically designed as the outer protective barrier, may be glass or plastic. However, glass tends to provide a better protective barrier given its strength and scratch resistance.

In general, the thicker the glass, the stronger it is. Unfortunately, with low profile handheld devices, the glass cover sheet is often relatively thin, which may reduce strength. However, improvements in glass strength may be possible with improved analysis techniques, which may reveal better ways of strengthening glass.

Thus, there is a continuing need for improved approaches to make glass covers for electronic devices that are not only thin but also sufficiently strong to avoid unnecessary damage.

SUMMARY OF THE INVENTION

Embodiments of the invention are related to apparatus, systems and methods for evaluating and/or improving strength of thin cover glass for consumer electronic devices. Optical coherence tomography analysis of strengthened glass can be used to evaluate its strength characteristics. For example, optical coherence tomography analysis may reveal fine details of a residual stress profile within chemically strengthened cover glass. One or more parameters of chemical strengthening treatments may be adjusted based upon the analysis of the residual stress profile.

The invention can be implemented in numerous ways, including as a method, system, device, or apparatus. Several embodiments of the invention are discussed below.

As an apparatus for optical coherence tomography analysis, one embodiment includes at least: an optical coherence tomography device for analyzing a cover glass having a residual stress profile; and a fixture for aligning the cover glass in an optical coupling with the optical coherence tomography device.

As a method for optical coherence tomography analysis, one embodiment comprises at least the acts of: optically coupling an optical coherence tomography device to a cover glass having a residual stress profile within the cover glass; and determining an analysis of the cover glass having the residual stress profile.

As a computer readable medium including at least computer program code stored thereon for analyzing a cover glass having a residual stress profile within the cover glass, one embodiment includes at least: computer program code for receiving polarization dependant interferogram data from detectors optically coupled to the cover glass; and computer program code for determining an analysis of the cover glass having the residual stress profile.

As a method for controlling parameters of chemical processing for strengthening cover glass, one embodiment comprises at least the acts of strengthening cover glass using a chemical process according to a first set of parameters, so as to introduce a residual stress profile within the cover glass; pulse illuminating the cover glass to generate signal pulses from the cover glass; determining from the signal pulses an analysis of the residual stress profile of the cover glass; and adjusting at least one member of the set parameters of the chemical process based upon the analysis of the cover glass.

As an apparatus for ultrahigh-resolution polarization-sensitive optical coherence tomography analysis, one embodiment comprises at least: a source of ultrashort illumination pulses; a splitter for splitting the ultrashort illumination pulses into probe pulses and reference pulses; a cover glass having a residual stress profile within the cover glass, wherein the cover glass is optically coupled to the splitter for receiving the probe pulses and for generating signal pulses in response to the probe pulses; a polarization sensitive splitter for splitting the reference pulses and the signal pulses depending upon polarization thereof; and detectors for detecting interferograms of the reference pulses and signal pulses depending upon polarization thereof.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 2A-2D are various views of various embodiments of the consumer electronic device.

FIGS. 7A-7D are partial block diagrams of apparatus for ultrahigh-resolution polarization-sensitive optical coherence tomography analysis according to various embodiments.

DETAILED DESCRIPTION OF EMBODIMENTS OF THE INVENTION

Embodiments of the invention are related to apparatus, systems and methods for evaluating and/or improving strength of thin cover glass for consumer electronic devices. Optical coherence tomography analysis of strengthened glass can be used to evaluate its strength characteristics. For example, optical coherence tomography analysis may reveal fine details of a residual stress profile within chemically strengthened cover glass. One or more parameters of chemical strengthening treatments may be adjusted based upon the analysis of the residual stress profile.

Chemically strengthening the surfaces, e.g., edges, of a cover glass may introduce a residual stress profile within the cover glass. A chemical strengthening process may include causing a diffusion exchange in which some sodium ($Na^+$) ions in the surfaces of the cover glass are replaced by potassium ($K^+$) ions. When $K^+$ ions, which are typically larger than $Na^+$ ions, replace $Na^+$ ions, a compression layer is effectively generated near the surface and, hence, the edges of a cover glass. Thus, the cover glass is essentially made stronger at the surface.

Embodiments of the invention are discussed below with reference to FIGS. 1-9. However, those skilled in the art will readily appreciate that the detailed description given herein with respect to these figures is for explanatory purposes as the invention extends beyond these limited embodiments.

Figure 1:
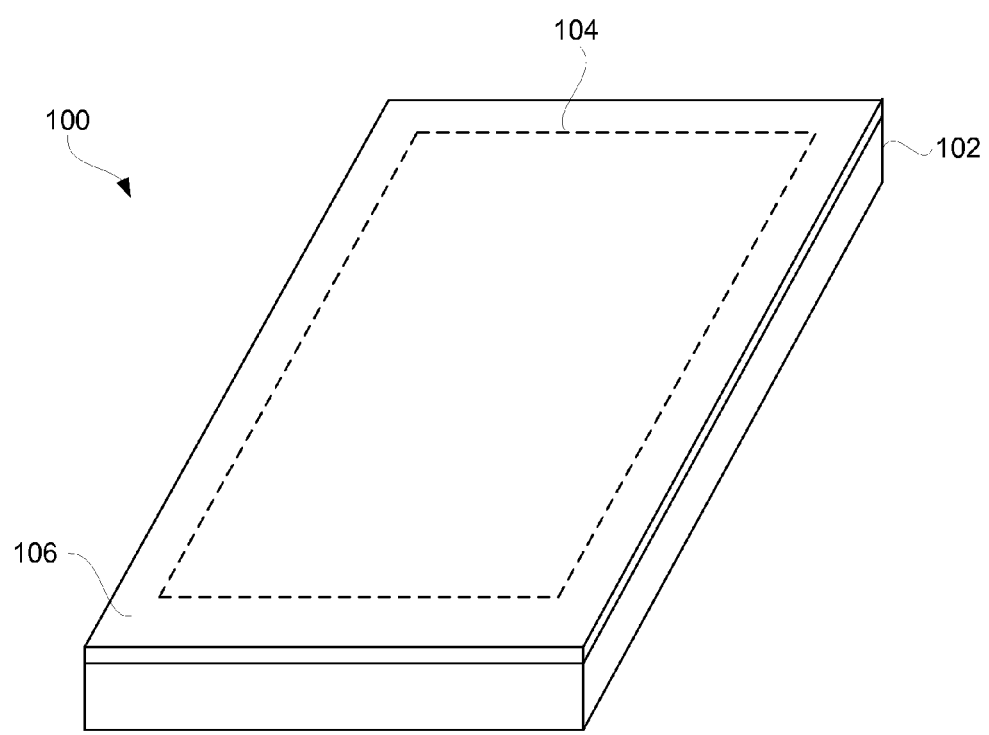
FIG. 1 is a simplified diagram of a consumer electronic device in accordance with one embodiment.

FIG. 1 is a simplified diagram of a consumer electronic device 100 in accordance with one embodiment. The consumer electronic device 100 may, for example, be embodied as a portable or handheld consumer electronic device having a thin form factor (or low profile). The consumer electronic device 100 may, for example, correspond to a media player, a media storage device, a Portable Digital Assistant (PDA), a tablet PCs, a computer, a cellular phone, a smart phone, a GPS unit, a remote control, and the like.

The consumer electronic device 100 may include a housing 102 that may serve as an outer surface for the consumer electronic device 100. Electrical components (not shown) may be disposed at least partially within the housing 102. The electrical components may include a controller (or processor), memory, battery, and a display. A display area 104 may be disposed within the housing 102 of the consumer electronic device 100. The consumer electronic device 100 may include a full view or substantially full view display area 104 that may consume a majority if not all of the front surface of the consumer electronic device 100.

The display area 104 may be embodied in a variety of ways. In one example, the display area 104 may comprise at least a display such as a flat panel display and more particularly an LCD display. Additionally, the consumer electronic device 100 may have a cover glass 106 provided over the display area 104. During assembly, the cover glass 106 may be coupled to the housing 102. An adhesive may be used in assembly.

The cover glass 106 may serve as an external surface, i.e., top surface, for the consumer electronic device 100. The cover glass 106 may be transparent so that the display area 104 can be viewed through the cover glass 106. The cover glass 106 may also resist scratching and therefore provide a substantially scratch-resistance surface for the top surface of the housing 102 for the consumer electronic device 100.

The display area 104 may alternatively or additionally include a touch sensing device positioned over a display screen. For example, the display area 104 may include one or more glass layers having capacitive sensing points distributed thereon. Each of these components may be separate layers or they may be integrated into one or more stacks. In one embodiment, the cover glass 106 may act as the outer most layer of the display area 104.

Accordingly, it should be understood that the display area 104 may include various layers. The various layers may include at least a display, and may additionally include a sensing arrangement disposed over the display. In some cases, the layers may be stacked and adjacent one another, and may even be laminated thereby forming a single unit. In other cases, at least some of the layers are spatially separated and not directly adjacent. For example, the sensing arrangement may be disposed above the display such that there is a gap therebetween. By way of example, the display may include a Liquid Crystal Display (LCD) that includes a Liquid Crystal Module (LCM). The LCM generally includes at least an upper glass sheet and a lower glass sheet that at least partially sandwich a liquid crystal layer therebetween. The sensing arrangement may be a touch sensing arrangement such as those used to create a touch screen. For example, a capacitive sensing touch screen can include substantially transparent sensing points or nodes dispersed about a sheet of glass (or plastic). A cover glass may serve as the outer protective barrier for the display region. The cover glass is typically adjacent the display region but can also be integrated with the display regions, such as another layer (outer protective layer) therefor.

As shown in FIG. 1, the cover glass 106 may extend across the entire top surface of the housing 102. In such a case, the edges of the cover glass 106 may be aligned, or substantially aligned, with the sides of the housing 102. However, given that the thickness of the cover glass 106 may be rather thin (i.e., less than a few millimeters), the cover glass 106 may be suitably strengthened so as to limit susceptibility to damage.

The glass material for the cover glass 106 may be selected from available glass that is stronger. For example, aluminosilicate glass (e.g., DVTS from Corning) may be one suitable choice for the glass material for the cover glass 106. Other examples of glass materials include, but are not limited to including, sodalime, borosilicate, and the like.

Additionally, the cover glass pieces may be chemically treated for strengthening. One suitable chemical treatment is to place the cover glass pieces in a chemical bath containing potassium (e.g., $KNO_3$) for a period of time (e.g., several hours) at an elevated temperature. The chemical treatment can desirably result in higher compression stresses at the surface of the cover glass pieces. The surface of the cover glass pieces includes the edges of the cover glass pieces. The higher compression stresses may be the result of $K^+$ ions effectively replacing some $Na^+$ ions at or near the surface of the cover glass.

FIGS. 2A and 2B are a diagrammatic representation of the consumer electronic device 200 according to one embodiment. FIG. 2A illustrates a top view for the consumer electronic device 200, and FIG. 2B illustrates a cross-sectional side view for the consumer electronic device 200 with respect to reference line A-A'. The consumer electronic device 200 may include a housing 202 that has a glass cover window 204 (cover glass) as a top surface. The cover window 204 may be transparent so that a display assembly 206 may be visible through the cover window 204. The display assembly 206 can, for example, be positioned adjacent the cover window 204. The display assembly 206 can, for example, be an LCD module. The housing 202 can also contain internal electrical components besides the display assembly, such as a controller (processor), memory, communications circuitry, etc. By way of example, the display assembly 206 may include a Liquid Crystal Display (LCD) that includes a Liquid Crystal Module (LCM). In one embodiment, the cover window 204 is integrally formed with the LCM. The cover window 204 may extend across the top surface of the housing 202 such that the edges of the cover window 204 may be aligned (or substantially aligned) with the sides of the housing 202.

The cover window 204 may generally be arranged or embodied in a variety of ways. By way of example, the cover window 204 may be configured as a protective glass piece that is positioned over an underlying display such as a flat panel display (LCD) or touch screen display (LCD and a touch layer). Alternatively, the cover window 204 may effectively be integrated with a display, i.e., glass window may be formed as at least a portion of a display. Additionally, the cover window 204 may be substantially integrated with a touch sensing device such as a touch layer associated with a touch screen. In some cases, the cover window 204 may serve as the outer most layer of the display area.

FIGS. 2C and 2D are a diagrammatic representation of the consumer electronic device 200' according to another embodiment. FIG. 2C illustrates a top view for the consumer electronic device 200', and FIG. 2D illustrates a cross-sectional side view for the consumer electronic device 200' with respect to reference line A-A'. The consumer electronic device 200' may include a housing 202' that has a glass cover window 204' (glass cover) as a top surface. The cover window 204' may be transparent so that a display assembly 206' is visible through the cover window 204'. The display assembly 206' can, for example, be positioned adjacent the cover window 204'. The display assembly 206' can, for example, be an LCD module. The housing 202' may also contain internal electrical components besides the display assembly, such as a controller (processor), memory, communications circuitry, etc. By way of example, the display assembly 206' may include a Liquid Crystal Display (LCD) that includes a Liquid Crystal Module (LCM). In one embodiment, the cover window 204' may be integrally formed with the LCM. The cover window 204' may extend across the top surface of the housing 202' such that the edges of the cover window 204' are aligned (or substantially aligned) with the sides of the housing 202'. As a front surface of consumer electronic device 200' may also include a click wheel control 208, the cover window 204' may not cover the entire front surface of consumer electronic device 200'. The consumer electronic device 200' may essentially include a partial display area that may cover a portion of the front surface.

The cover window 204' may generally be arranged or embodied in a variety of ways. By way of example, the cover window 204' may be configured as a protective glass piece that is positioned over an underlying display such as a flat panel display (LCD) or touch screen display (LCD and a touch layer). Alternatively, the cover window 204' may effectively be integrated with a display, i.e., glass window may be formed as at least a portion of a display. Additionally, the cover window 204' may be substantially integrated with a touch sensing device such as a touch layer associated with a touch screen. In some cases, the cover window 204' can serve as the outer most layer of the display area.

As previously discussed, cover glass may be used as an outer surface of portions of a housing for consumer electronic devices, e.g., handheld consumer electronic devices. A handheld consumer electronic device may, for example, function as a media player, phone, internet browser, email unit or some combination of two or more of such. With reference to FIGS. 2A-2D, different handheld consumer electronic devices having cover glass (or glass windows) may be assembled in accordance with various embodiments. By way of example, the handheld consumer electronic devices may correspond to an iPhone™ or iPod™ manufactured by Apple Inc. of Cupertino, Calif.

In one embodiment, the size of the cover glass depends on the size of the associated consumer electronic device. For example, with handheld consumer electronic devices, the cover glass may be less than about five (5) inches diagonal. As another example, for portable consumer electronic devices, such as smaller portable computers or tablet computers, the cover glass may range between about four (4) to about twelve (12) inches diagonal. As still another example, for portable consumer electronic devices, such as full size portable computers, displays or monitors, the cover glass may range between about ten (10) to about twenty (20) inches diagonal or even larger.

However, it should be appreciated that with larger screen sizes, the thickness of the glass layers may need to be greater. The thickness of the glass layers may need to be increased to maintain planarity of the larger glass layers. While the displays may still remain relatively thin, the minimum thickness may increase with increasing screen size. For example, minimum thickness of the cover may correspond to about 0.4 mm for small handheld consumer electronic devices, about 0.6 mm for smaller portable computers or tablet computers, about 1.0 mm or more for full size portable computers, displays or monitors, again depending on the size of the screen. The thickness of the cover glass may depend on the application and/or the size of consumer electronic device. While the current trend is to accommodate thinner and thinner devices, some examples for thicknesses of the cover glass may correspond to about 1 mm for small handheld consumer electronic devices, about 2 mm for smaller portable computers or tablet computers, about 3 mm or more for full size portable computers, displays or monitors, again depending on the size of the screen.

As noted above, the consumer electronic device can be a handheld consumer electronic device or a portable consumer electronic device. Strengthening can serve to enable the cover glass to be not only thin but also adequately strong. Since handheld consumer electronic devices and portable consumer electronic devices are mobile, they are potentially subjected to various different impact events and stresses that stationary devices are not subjected to. As such, strengthened cover glass is well suited for implementation with displays for handheld consumer electronic device or a portable consumer electronic device that are designed to be thin.

Cover glass or, more generally, a glass piece may be chemically treated such that surfaces of the glass are effectively strengthened. For example, in an initial exchange process, some $Na^+$ ions near the surface regions of the glass piece may be replaced by $K^+$ ions, introducing residual compression stress to strengthen the surface regions.

In addition to chemically strengthening the glass as just discussed, additional chemical treatment may introduce a crack arresting feature, so as to toughen the glass against fracture. In a double ion exchange process, once the $K^+$ ions replace the $Na^+$ ions, so as to chemically strengthen the glass, the $K^+$ ions closest to the outside surfaces of the glass piece, e.g., the top surface regions, may be replaced by $Na^+$ ions in order to remove some residual compression stress from near the top surface regions, while underlying $K^+$ ions may remain in the lower surface regions. In addition to reducing such surface residual compression stress for the cover glass, the double ion exchange process may reduce residual central tension for the cover glass. The foregoing may introduce the crack arresting feature for toughening the glass against fracture.

Figure 3A:
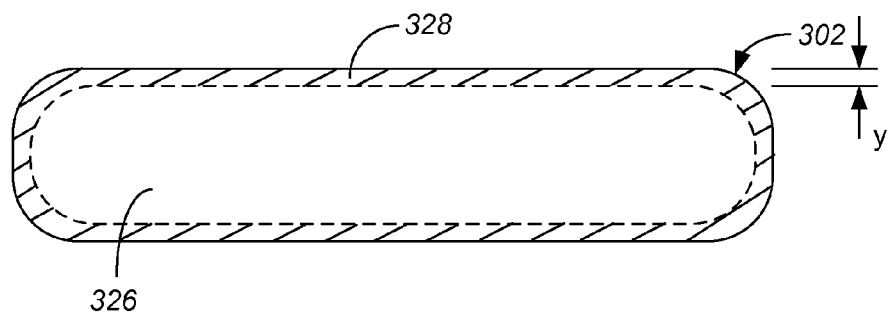
FIGS. 3A and 3B are cross-sectional diagrams of cover glass which has been chemically treated.
Figure 3B:
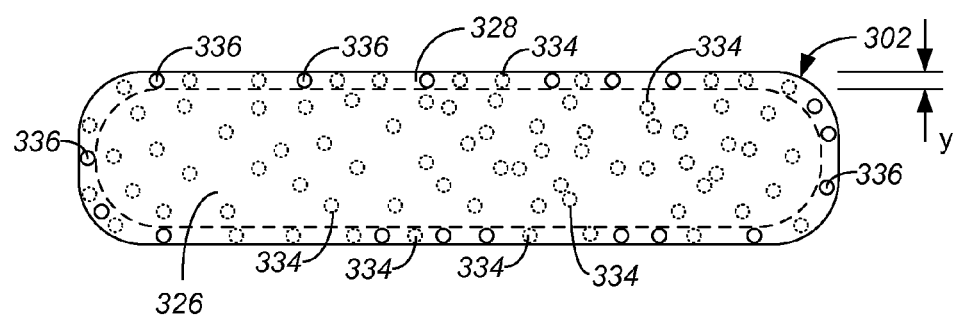

Cover glass which has undergone a chemical strengthening process generally includes a chemically strengthened layer, as previously mentioned. FIGS. 3A and 3B are cross-sectional diagrams of cover glass 300, which has been chemically treated such that a chemically strengthened layer 328 is created according to one embodiment. Chemically strengthened layer 328 has a thickness (y) which may vary depending upon the requirements of a particular system in which cover glass 300 is to be utilized. Cover glass 300 may include a non-chemically strengthened portion 326 in addition to chemically strengthened layer 328. While cover glass 300 is shown as having a rounded edge geometry 302, it should be appreciated that cover glass 300 may generally have any edge geometry such as may be selected to increase the strength of the edges of cover glass 300. Rounded edge geometry 302 is depicted by way of example, and not for purposes of limitation.

As shown in FIG. 3B, non-chemically strengthened portion 326 generally may include $Na^+$ ions 334 but no $K^+$ ions 336. A chemical strengthening process may cause chemically strengthened layer 328 to be formed such that chemically strengthened layer 328 may include both $Na^+$ ions 334 and $K^+$ ions 336. In one embodiment, chemically strengthened layer 328 may be such that an outer portion of chemically strengthened layer 328 may include substantially only $Na^+$ ions 334 while an underlying portion of chemically strengthened layer 328 may include both $Na^+$ ions 334 and $K^+$ ions 336

Figure 4A:
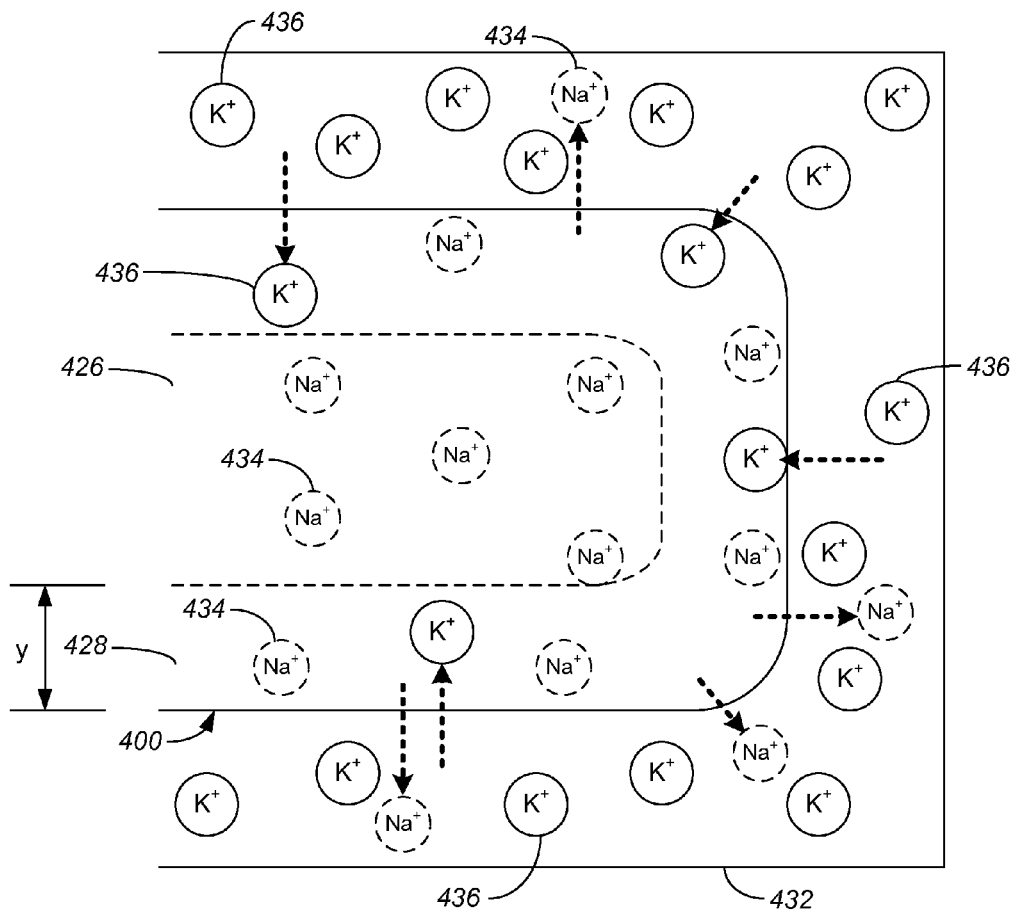
FIGS. 4A and 4B are diagrammatic representations of chemical treatment processes.

FIG. 4A is a diagrammatic representation of a chemical treatment process that involves submerging a cover glass in a potassium bath according to one embodiment. When cover glass 400, which is partially shown in cross-section, is submerged or soaked in a heated potassium bath 432, diffusion may occur. As shown, Na+ions 434 which are present in cover glass 400 may diffuse into potassium bath 432, while $K^+$ ions 436 in potassium bath 432 may diffuse into cover glass 400 such that a chemically strengthened layer 428 is formed. In other words, $K^+$ ions 436 from potassium bath 432 may be exchanged with $Na^+$ ions 434 to form chemically strengthened layer 428. $K^+$ ions 436 may not have diffused into a center portion 426 of cover glass 400. By controlling parameters such as duration of a chemical strengthening treatment and/or the concentration of $K^+$ ions 436 in potassium bath 432, residual compression stress and thickness (y) of chemically strengthened layer 428 may be substantially controlled.

Figure 4B:
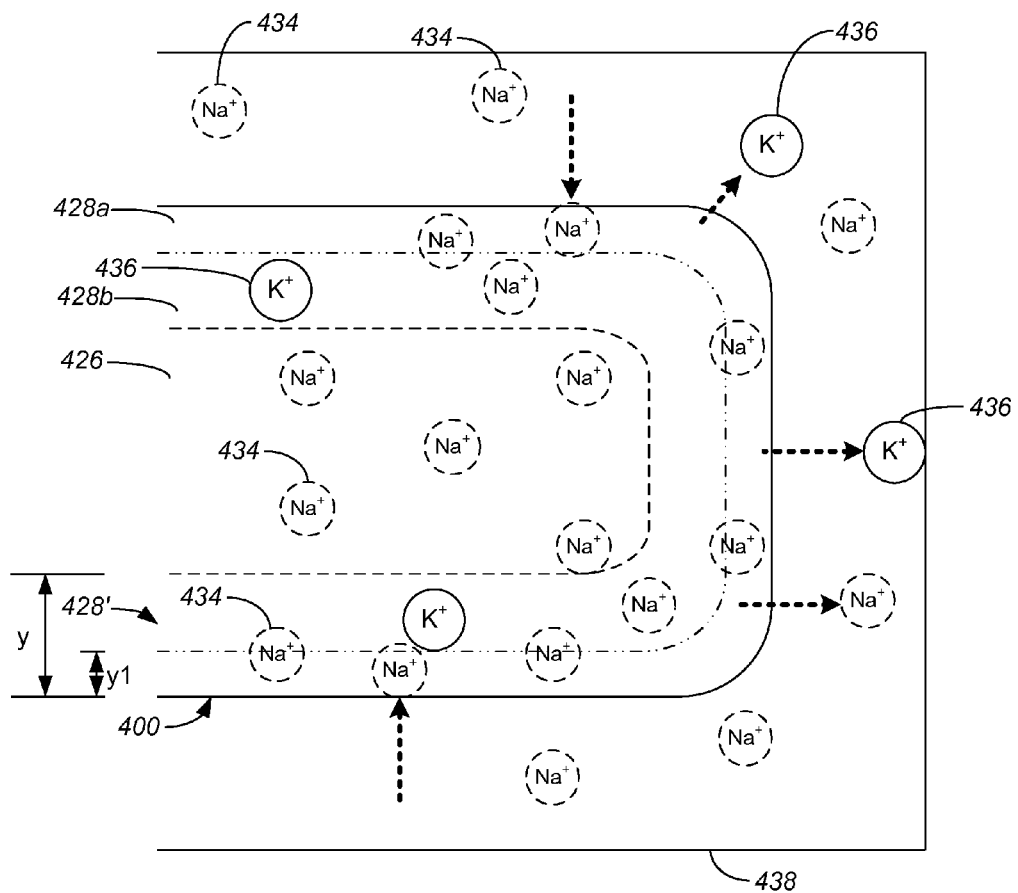

Cover glass 400 may further be treated to substantially remove $K^+$ ions 436 located near an outer surface of chemically strengthened layer 428. A sodium bath may be used to facilitate the removal of such $K^+$ ions 436. FIG. 4B is a diagrammatic representation of a chemical treatment process that involves submerging cover glass in a sodium bath after the cover glass has previously been submerged in a potassium bath according to one embodiment. Cover glass 400, which was previously submerged in a potassium bath as described previously with respect to FIG. 4A, may be submerged in a sodium bath 438 to such that a chemically strengthened layer 428' may include an outer layer 428a which includes substantially only $Na^+$ ions 434, and an inner layer 428b which includes both $Na^+$ ions 434 and K+ions 436. When cover glass 400 is submerged in sodium bath 438, $Na^+$ ions 434 may displace $K^+$ ions 436 from outer layer 428a, while K+ions 436 remain in inner layer 428b. Thus, inner layer 428b, which may include $K^+$ ions 436 and $Na^+$ ions 434, may be effectively positioned between outer layer 428a and a non-chemically strengthened portion 426, both of which may substantially exclude $K^+$ ions 436. Displaced $K^+$ ions 436 may effectively diffuse from outer layer 428a into sodium bath 438.

Chemically strengthened layer 428' may have a thickness (y), while outer layer 428a may have a thickness (y1). The thickness (y1) may be substantially controlled by parameters such as the concentration of $Na^+$ ions 434 in sodium bath 438, as well as by the amount of time cover glass 400 is submerged in sodium bath 438.

Parameters such as the concentration of $K^+$ ions in a potassium bath may be varied while cover glass is soaking in the potassium bath. In other words, the concentration of $K^+$ ions in a potassium bath may be maintained substantially constant, may be increased, and/or may be decreased while cover glass is submerged in the potassium bath without departing from the spirit or the scope of the present invention. For example, as $K^+$ ions displace $Na^+$ ions in the glass, the $Na^+$ ions become part of the potassium bath. Hence, the concentration of $K^+$ ions in the potassium bath may change unless additional $K^+$ ions are added into the potassium bath.

Varying parameters such as varying the concentration of $K^+$ ions in a potassium bath and/or varying the soaking time of cover glass in the potassium bath may enable the tension at approximately the center of the cover glass to be controlled. The degree of fragmentation of the cover glass in the case of a glass fracture may be substantially controlled by controlling the tension at approximately the center of the cover glass. In one embodiment, a preferred characteristic strength at approximately the center of the cover glass may be achieved by submerging the cover glass for approximately six (6) hours in a potassium bath with a $K^+$ ion concentration that is between approximately forty percent (40%) and approximately ninety-eight percent (98%).

Parameters associated with a potassium bath and/or a sodium bath may generally vary widely. The concentration of potassium in a potassium bath may vary, as previously mentioned. Similarly, the concentration of sodium in a sodium bath used in a double ion exchange process may also vary. Additionally, the temperature to which the baths are heated, as well as the length of time cover glasses are submerged in the baths may also vary widely. The temperature is not limited to being between approximately 410 degrees Celsius and approximately 420 degrees Celsius. It should be appreciated that although a total soak time for a cover glass has been described as being approximately equal to six (6) hours, the total soak time may be less than or greater than approximately six (6) hours. By way of example, a total time a cover glass is submerged in a potassium bath may be approximately ten (10) hours. Further, a total time a cover glass is submerged in a potassium bath and a sodium bath during a double ion exchange process may be approximately ten hours (10), e.g., where the cover glass is submerged in the potassium bath for approximately 6.7 hours and in the sodium bath for approximately 3.3 hours.

In light of the foregoing, it should be understood that a residual stress profile within the cover glass may be substantially controlled by chemical treatment processes, and in particular by variably controlling parameters of chemical treatment processes. Further, as will be discussed in greater detail subsequently herein, cover glass may be strengthened using a chemical process according to a first set of parameters; an analysis of the cover glass having the residual stress profile may be determined; and at least one member of the set parameters of the chemical process may be adjusted based upon the analysis of the cover glass having the residual stress profile.

Figure 5:
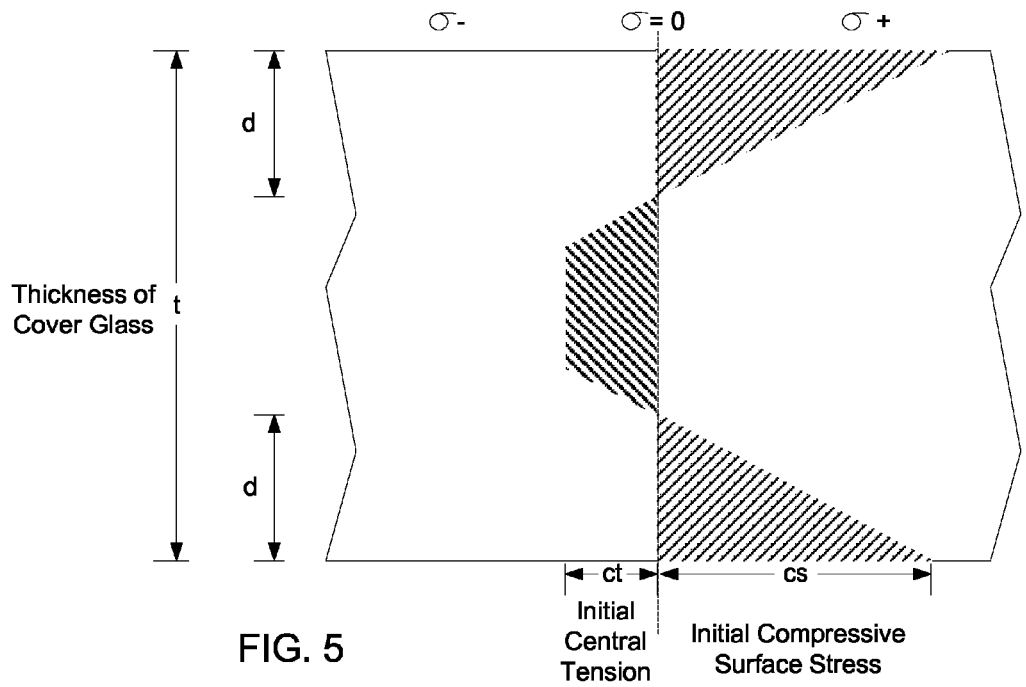
FIG. 5 is a simplified diagram of a partial cross-sectional view of the cover glass, which shows compression/tension features of an initial residual stress profile within the cover glass.

FIG. 5 is a simplified diagram of a partial cross-sectional view of the cover glass, which shows compression/tension features of an initial residual stress profile within the cover glass. The initial residual stress profile may result from the initial exchange process to strengthen the surface regions. In legends disposed along a top horizontal dimension of the diagram, a lower case Greek letter sigma is used. A minus sigma legend indicates a profile region of tension. A plus sigma legend indicates profile regions of compression. A vertical dashed line and a sigma-equals-zero legend designates crossover between compression and tension.

In the partial cross-sectional view of the cover glass, thickness (t) of the cover glass is shown. Compression surface layer depth (d) corresponds to the initial compression surface stress in FIG. 5. The compression surface layer depth extends from surfaces of the cover glass towards a central region shown in the cross-section view of the cover glass. The cover glass may be chemically strengthened for a sufficient period of time (for example for approximately six hours or more in a melt bath of KNO3), so that the compression surface layer depth of the cover glass is substantially greater than a preselected compression surface layer depth value. For example, the compression surface layer depth (d) of the cover glass may be substantially greater than a preselected compression surface layer depth value of approximately fifty microns.

Initial compression surface stress (cs) of the initial residual stress profile is shown in FIG. 5. Initial central tension (ct) is shown in the central region, in the initial residual stress profile of the cover glass.

In FIG. 5, the initial compression surface stress is simplified to show profile peaks at the surfaces of the cover glass. However, there may be some natural surface relaxation, not shown in the simplified diagram of FIG. 5, which may submerge profile peaks a minor amount. Even with such natural surface relaxation, many potassium ions and significant compression surface stress still remain at the surfaces of the cover glass, as depicted in a simplified way in FIG. 5.

The initial compression surface stress shows decreasing profiles as the compression surface layer depth extends from surfaces of the cover glass (and towards the central region, shown in the cross-section view of the cover glass.) The initial compression surface stress continues showing decreasing profiles until crossover between compression and tension. In the diagram FIG. 5, regions of the decreasing profiles of the initial compression surface stress are highlighted using right-to-left diagonal hatching.

After crossover between compression and tension, a profile of the initial central tension extends into the central region shown in the cross-section view of the cover glass. In the diagram FIG. 5, the profile of the initial central tension extending into the central region is highlighted using left to right diagonal hatching.

Figure 6:
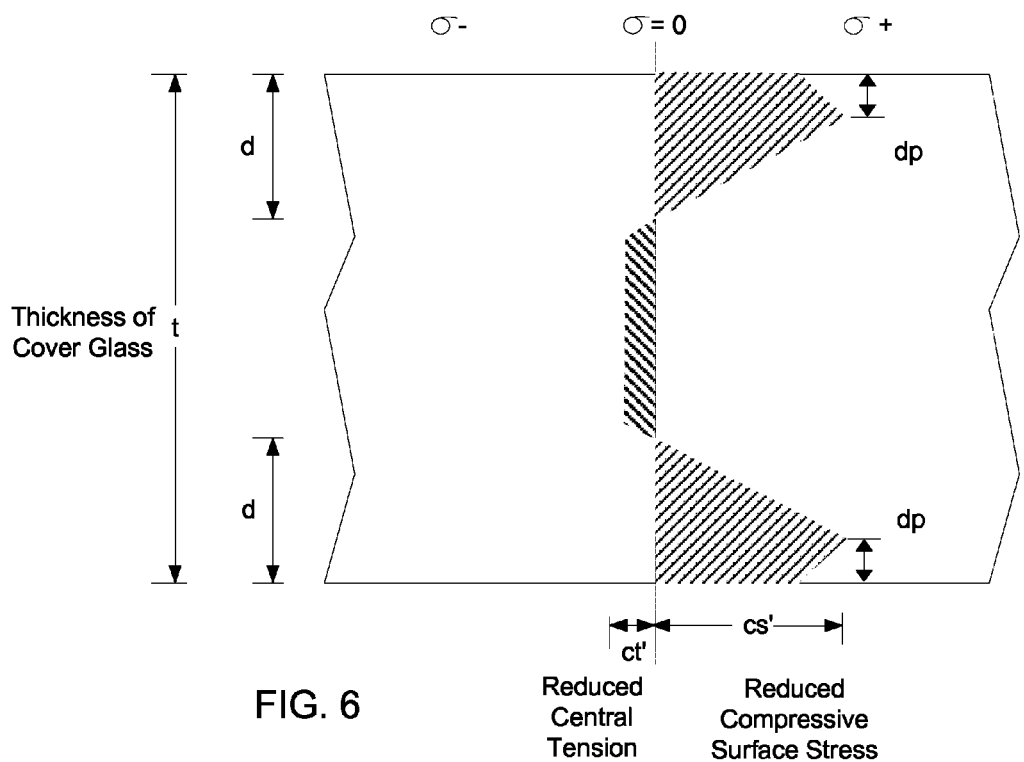
FIG. 6 is a simplified diagram of a partial cross-sectional view of the cover glass, which shows compression/tension features of a modified residual stress profile within the cover glass.

FIG. 6 is a simplified diagram of a partial cross-sectional view of the cover glass, which shows compression/tension features of a modified residual stress profile within the cover glass. The modified residual stress profile may result from the double ion exchange process, and particularly from chemically toughening the glass. Accordingly FIG. 6 shows the modified residual stress profile within double ion exchanged glass. In FIG. 6, compression surface layer depth (d) now corresponds to the reduced compression surface stress. Reduced compression surface stress (cs') of the modified residual stress profile is shown in FIG. 6. Reduced central tension (ct') is shown in the central region, in the modified residual stress profile of the glass cover.

In FIG. 6, the reduced compression surface stress shows submerged profile peaks, below the surfaces of the glass cover. Depth (dp) corresponding to such compression stress peaks may be substantially within a range of approximately ten to thirty microns. In light of the foregoing, it should be understood that the reduced compression surface stress shows increasing profiles as the compression surface layer depth extends from surfaces of the glass cover (and towards the submerged profile peaks.) Such increasing profiles of compression surface stress, extending from surfaces, may be advantageous in arresting cracks. Within the depth of the submerged profile peaks (dp), as a crack attempts to propagate from the surface, deeper into the glass, it is met with increasing compression surface stress, which may provide crack arresting action. Introduction of such crack arrest feature in the glass may toughen the glass against fracture.

As shown in FIG. 6, extending from the submerged profile peaks towards the central region, the reduced compression surface stress turns to show decreasing profiles, until crossover between compression and tension. In the diagram FIG. 6, regions of profiles of the reduced compression surface stress are highlighted using right-to-left diagonal hatching. As shown in FIG. 6, the modified residual stress profile within double ion exchanged glass of the cover glass may be substantially non-monotonic.

As shown in FIG. 6, after crossover between compression and tension, a profile of the reduced central tension extends into the central region shown in the cross-section view of the glass cover. In the diagram FIG. 6, the profile of the reduced central tension extending into the central region is highlighted using left to right diagonal hatching.

Initial central tension substantially in excess of a preselected tension value may disadvantageously promote fracturing of the glass cover. Reducing the initial central tension relative to the preselected tension value may advantageously limit fracturing of the glass cover. Comparison of FIG. 5 to FIG. 6 highlights the double ion exchange process reducing the initial central tension (ct) shown in FIG. 5 relative to the preselected tension value, so as to provide the reduced central (ct') shown in FIG. 6. For example, in double ion exchange glass, the double ion exchange process may reduce an initial central tension (ct) relative to a preselected tension value, so as to provide the reduced central tension (ct').

In the cover glass, initial central tension (ct) may be substantially related to the initial compression surface stress (cs); and reduced central tension (ct') may be substantially related to the reduced compression surface stress (cs'). Accordingly, it should be understood that reducing the initial compression surface stress (cs) shown FIG. 5 to the reduced compression surface stress (cs') shown in FIG. 6 is related to reducing the initial central tension (ct) shown in FIG. 5 to the reduced central tension (ct') shown in FIG. 6.

While reducing the initial central tension (ct) may be desirable to advantageously limit fracturing of the glass cover, reducing the initial compression surface stress (cs) reduces an enhanced surface strength, which was provided by the initial exchange process. Accordingly, it may be advantageous to limit reduction of the initial compression surface stress in the double ion exchange process, so as to produce a limited reduction of the enhanced surface strength. Further, it should be understood that the chemical toughening treatment of the sodium bath may be employed over a period of time. The period of time of the chemical toughening treatment may be limited, for example, so as to produce the limited reduction in the enhanced strength of the glass covers.

Comparison of FIG. 5 to FIG. 6 highlights limiting reduction of the initial compression surface stress (cs) shown in FIG. 5 in the double ion exchange process relative to a preselected compression value, so that the reduced compression surface stress (cs') shown in FIG. 6 remains substantially greater than the preselected compression value.

It should be understood that FIGS. 5 and 6 just discussed are simplified diagrams, showing illustrative but greatly simplified views of residual stress profiles within cover glass. However, relative to the greatly simplified views shown in FIGS. 5 and 6, more detail and accuracy may be determined. In particular, as discussed subsequently herein, ultrahigh-resolution polarization-sensitive optical coherence tomography may determine a detailed and accurate analysis of the residual stress profile of the compression surface layer of the cover glass.

FIGS. 7A-7D are partial block diagrams of apparatus 7000A, 7000B, 7000C, 700D according to various embodiments for ultrahigh-resolution polarization-sensitive optical coherence tomography analysis of cover glass 706 having the residual stress profile of the compression surface layer of the cover glass. The cover glass 706 may be analyzed while the cover glass 706 is assembled into the consumer electronic device 700. Electrical components of the consumer electronic device 700 may be provided at least partially internal to a housing 702, which may be attached to the cover glass 706. The consumer electronic device 700 may be a cell phone, a portable media player, a personal digital assistant, a remote control device or other consumer electronic device.

In FIGS. 7A-7D cover glass 706 is shown assembled into the consumer electronic device 700, and a suitable fixture 707 is provided for alignment of the cover glass, when the cover glass 706 is so assembled. However, in other embodiments, for analysis of the residual stress profile, the cover glass need not already be assembled into the consumer electronic device, and a suitable alternative fixture 707 may be provided for alignment.

In FIGS. 7A-7D a fixture 707 may align the cover glass 706 in an optical coupling to receive a beam of probe pulses from various embodiments of the ultrahigh-resolution polarization-sensitive optical coherence tomography device 709A, 709B, 709C, 709D. The beam of probe pulses may include constituent light resolvable into both horizontal and vertical polarization components, which may be extremely close to equal in power. The beam of probe pulses may be circularly polarized, and further may have a very high degree of circular polarization. Size of the beam of probe pulses may affect size of an analysis region of the compression surface layer of the cover glass 706.

Further, in FIGS. 7A-7D distributed along various depths of the compression surface layer of the cover glass 706, the beam of probe pulses may be partially reflected so as to generate signal pulses, which may be optically coupled back into the embodiments of the ultrahigh-resolution polarization-sensitive optical coherence tomography device 709A, 709B, 709C, 709D, as shown in FIGS. 7A-7D.

Residual stress of the compression surface layer of the cover glass 706 may induce photoelastic birefringence. Accordingly, in embodiments where the probe pulses are circularly polarized, polarization of reflected signal pulses may change polarization relative to the circular polarization of the probe pulses. As a general matter, the reflected signal pulses may become elliptically polarized to varying angles of ellipticity, in response to the foregoing photoelastic birefringence.

More particularly, at various points of the compression surface layer, residual stress may be expressed as various stress tensors. Photoelasticity linearly relates such stress tensors to corresponding second rank dielectric permittivity tensors. Birefringence concerns linear relationships between such dielectric permittivity tensors and electric field vectors or electromagnetic waves propagating in anisotropic media. In particular, birefringence corresponds to the special cases of real-symmetric dielectric permittivity tensors with eigenvalues along the three orthogonal principle axes of polarization. The residual stress profile of the compression surface layer of the cover glass 106 may be ascertained by determining from the signal pulses the photoelastic birefringence induced in the glass by the residual stress along an axial depth scan of the compression surface layer of the cover glass.

The various embodiments of ultrahigh-resolution polarization-sensitive optical coherence tomography devices 709A, 709B, 709C, 709D shown in FIGS. 7A-7D may be coupled to a computer 708, which may execute suitable computer program code for receiving depth resolved polarization dependant interferogram data of axial depth scans (A-scans) of the cover glass 706. Further, in addition to such axial depth scans (A-scans) of the cover glass, actuators of the fixture 707 may controllably move the cover glass, so as to provide for additional modes of scanning the cover glass 706. Actuators of the fixture 707 may controllably move the cover glass longitudinally and/or laterally as depicted by notional crossed arrows on the cover glass 706.

Computer 708 may be coupled to the fixture 707 and programmed for controlling such movement of the cover glass. Computer 708 may be coupled to the fixture 707 and programmed for ascertaining position of the cover glass 706 while receiving corresponding depth resolved polarization dependant interferogram data of axial depth scans (A-scans) of the cover glass 706. Cross-sectional tomography scans (B-scans) of the cover glass may be collected by combining data from adjacent series of axial depth scans (A-scans). Moreover, en face imaging scans (C-scans) at particular acquired depths may be determined from data of adjacent axial depth scans (A-scans.)

Furthermore, as shown by notional arced arrows adjacent to a legend "Roll Angle" in FIGS. 7A-7D, the fixture 707 may provide for variable selection of a given roll angle of the cover glass 706. In FIGS. 7A-7D, alternative dotted line depictions of an extremity of the cover glass 706 highlight examples of alternative roll angled positions of the cover glass. Accordingly, in light of the foregoing, actuators of the fixture 707 may controllably move the cover glass longitudinally and/or laterally in an angled plane of the compression surface layer of the cover glass, since the compression surface layer of the cover glass may be oriented according to the given selected roll angle. Similarly, the given roll angle of the cover glass may be selected for a given A-scan, B-scan or C-scan.

Moreover, as shown by notional arced arrows adjacent to a legend "Pitch Angle" in FIGS. 7A-7D, the fixture 707 may provide for variable selection of a given pitch angle of the cover glass 706. In FIGS. 7A-7D, alternative dotted line depictions of an opposing extremity of the cover glass 706 highlight examples of alternative pitch angled positions of the cover glass. Accordingly, in light of the foregoing, actuators of the fixture 707 may controllably move the cover glass longitudinally and/or laterally in an angled plane of the compression surface layer of the cover glass, since the compression surface layer of the cover glass may be oriented according to the given selected pitch angle. Similarly, the given pitch angle of the cover glass may be selected for a given A-scan, B-scan or C-scan.

Computer 708 may be coupled to the fixture 707 and programmed for controlling the foregoing movement and/or roll angle and/or pitch angle of the cover glass. Computer 708 may further execute computer program code for generating birefringent phase retardation data from the depth resolved polarization dependant interferogram data (Jones calculus or Mueller calculus may be used in combination with the depth resolved polarization dependant interferogram data.) Additionally, the computer 708 may execute computer program code for analyzing the birefringent phase retardation data to determine the analysis of the cover glass having the residual stress profile (corresponding calibration values for stress and for birefringent phase retardation may be used.)

Figure 7A:
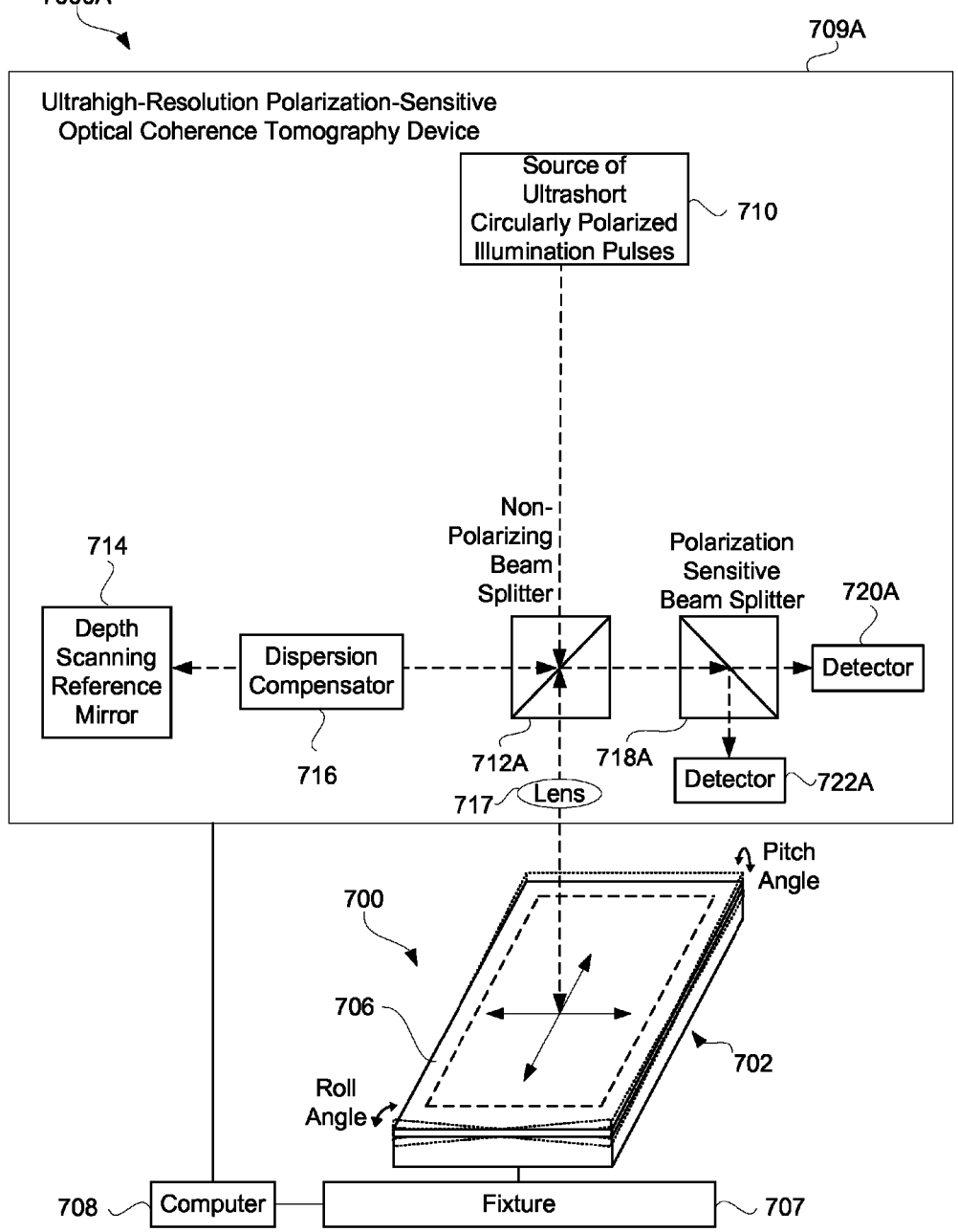
Figure 7B:
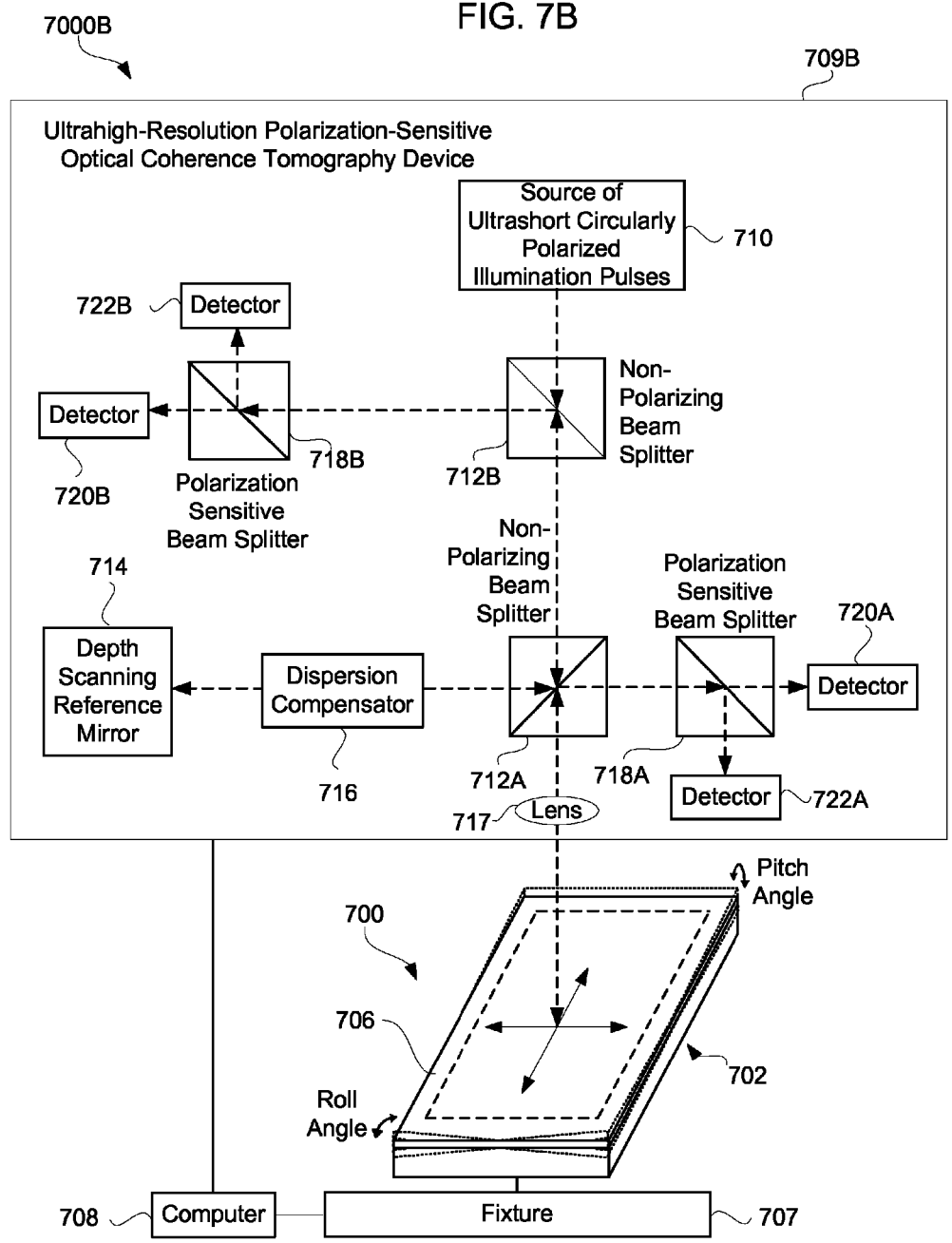
Figure 7C:
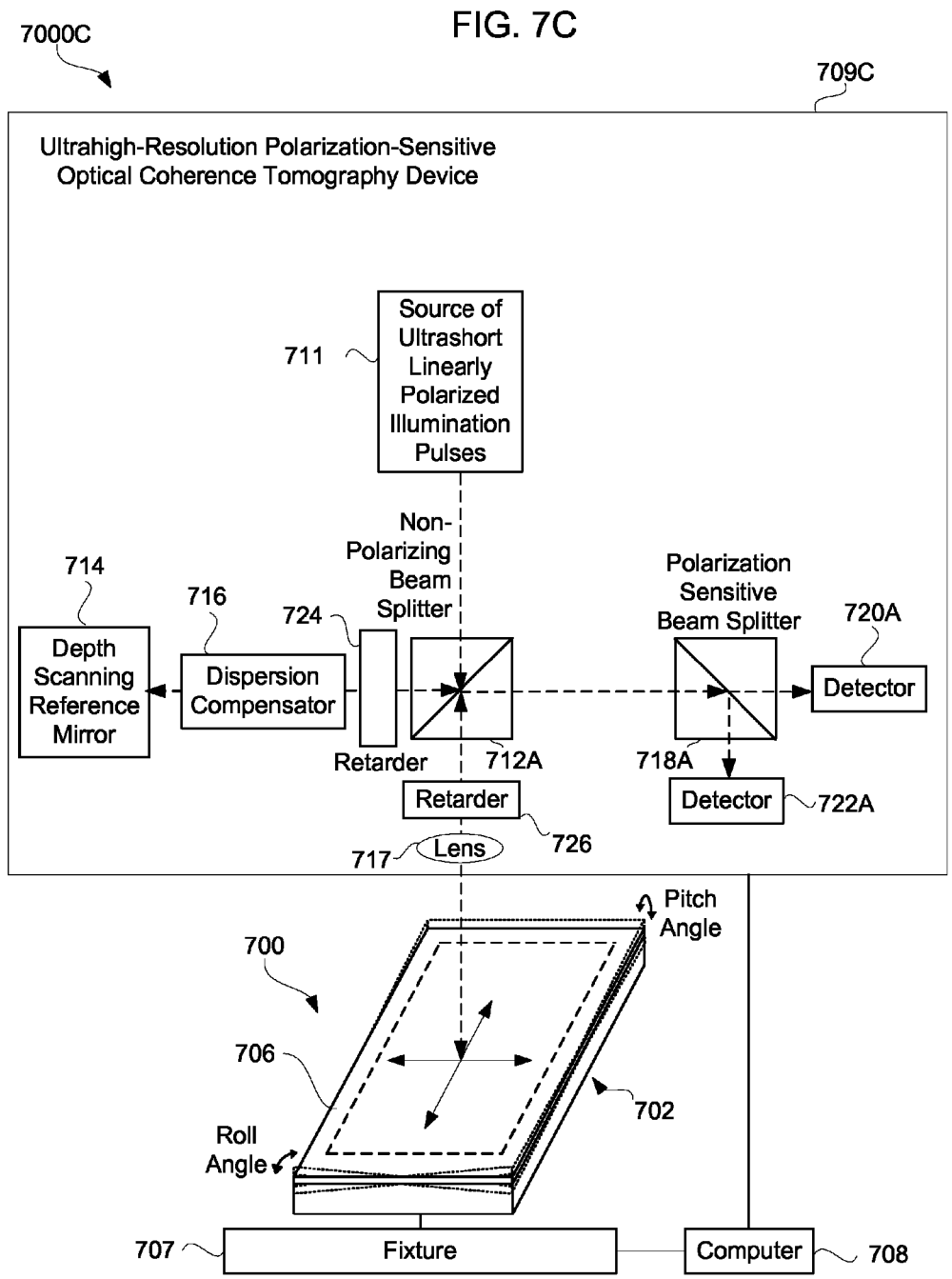

The various embodiments of ultrahigh-resolution polarization-sensitive optical coherence tomography devices 709A, 709B, 709C, 709D shown in FIGS. 7A-7D may comprise a broadband polarized light source, which may have ultra-low coherence, which may have a corresponding ultra-short coherence length. Axial depth resolution of embodiments of the ultrahigh-resolution polarization-sensitive optical coherence tomography device 709A, 709B, 709C, 709D may be related to such ultra-short coherence length, and the ultra-short coherence length may provide ultrahigh-resolution. As shown in FIGS. 7A and 7B a source 710 of ultrashort circularly polarized illumination pulses may be employed. In other embodiments, as shown in FIGS. 7C and 7D, a source 711 of ultrashort linearly polarized illumination pulses may be employed. The circularly polarized source 710 shown in FIGS. 7A and 7B and the linearly polarized source 711 shown in FIGS. 7C and 7D may comprise a femtosecond class laser such as the FEMTOSOURCE™ rainbow™ laser offered by FEMTOLASERS, Inc. having an address at 1 Mifflin Pl., 119 Mt. Auburn St., Suite 400 Cambridge, Mass.

FEMTOLASERS, Inc. specifies the output of the RAINBOW™ laser as being polarized 100:1 horizontal. However, arrangement of the RAINBOW™ laser may be rotated so as to provide vertical polarization. In any case, whether the RAINBOW™ laser is arranged to provide vertical polarization or horizontal polarization, for purposes of simplicity of discussion herein, the RAINBOW™ laser may be deemed to provide vertical polarization reference relative to orientation arrangement of the remaining optical components in embodiments of ultrahigh-resolution polarization-sensitive optical coherence tomography devices 709A, 709B, 709C, 709D shown in FIGS. 7A-7D. Such remaining optical components of embodiments of the ultrahigh-resolution polarization-sensitive optical coherence tomography device 709A, 709B, 709C, 709D may be procured from various sources, such as Thorlabs, having an address at 435 Route 206 North, Newton, N.J. Additionally, although optical fiber based optical components are not shown in the embodiments of FIGS. 7A-7D, it should be understood that optical fiber based optical components may be used in other embodiments.

Further, it should be understood that in the source 710 of ultrashort circularly polarized illumination pulses as shown in FIGS. 7A and 7B, and in the source 711 of ultrashort linearly polarized illumination pulses shown in FIGS. 7C and 7D, an additional polarizer may be coupled adjacent to the RAINBOW™ laser to ensure a high degree of linear polarization from the RAINBOW™ laser. Moreover, in the case of the source 710 of ultrashort circularly polarized illumination pulses shown in FIGS. 7A and 7B, such source 710 may further comprise a retarder for imparting a high degree of circular polarization. For example, a quarter-wave plate may be arranged at a forty-five degree orientation with the polarizer so as to provide the high degree of circular polarization.

In further discussion with particular reference to the embodiment 709A of the ultrahigh-resolution polarization-sensitive optical coherence tomography device shown in FIG. 7A, the source 710 of ultrashort circularly polarized illumination pulses may be optically coupled with a non-polarizing beam splitter 712A for splitting the ultrashort circularly polarized illumination pulses into probe pulses (which may have a very high degree of circular polarization) and reference pulses (which may have a very high degree of circular polarization.) In FIG. 7A the ultrashort circularly polarized illumination pulses from the source 710, which are coupled into the splitter 712A, are depicted by a dashed line arrow extending from the source 710 to the non-polarizing beam splitter 712A.

An axial depth scanning reference mirror 714 may be optically coupled to the non-polarizing beam splitter 712A for moveably reflecting received reference pulses back to the non-polarizing beam splitter 712A, as depicted by a dashed line double headed arrow extending between mirror 714 and splitter 712A. A piezoelectric actuator may be used for moving the axial depth scanning reference mirror 714 in the axial depth scans (A-scans), so as to obtain interferogram depth resolution (and corresponding depth resolution of the residual stress profile, which extends depthwise into the cover glass from the surface of the cover glass 706.) As shown in FIG. 7A, the reference pulses may pass through a dispersion compensator 716 to reduce any pulse broadening.

Cover glass 706, having the residual stress profile of the compression surface layer of the cover glass, may be optically coupled through a lens 717 to the non-polarizing beam splitter 712A for receiving the probe pulses and for generating signal pulses in response to the probe pulses. In FIG. 7A the probe pulses and responsive signal pulses are depicted by a dashed line double headed arrow extending between the splitter 712A and the cover glass 706, wherein a direction of a first one of the arrow heads illustrates the probe pulses from the splitter 712A to the cover glass, and wherein a return direction of the other one of the arrow heads illustrates the responsive signal pulses.

A polarization sensitive beam splitter 718A may be optically coupled to the non-polarizing beam splitter 712A for receiving the reference pulses and signal pulses from non-polarizing beam splitter 712A, as depicted by a dashed line arrow extending from the non-polarizing beam splitter 712A to the polarization sensitive beam splitter 718A. The polarization sensitive beam splitter 718A may split the reference pulses and the signal pulses depending upon polarization thereof. Detectors 720A, 722A may be optically coupled to the polarization sensitive beam splitter 718A for detecting depth resolved interferograms of the reference pulses and signal pulses depending upon polarization thereof. Split polarizations of the reference pulses and the signal pulses are depicted by dashed line arrows extending from the polarization sensitive beam splitter 718A to the detectors 720A, 722A.

Analog to digital converters associated with the detectors 720A, 722A may generate depth resolved polarization dependant interferogram data from detection of the depth resolved polarization dependant interferograms. As mentioned previously herein, the ultrahigh-resolution polarization-sensitive optical coherence tomography device 709A may be coupled to computer 708, which may execute suitable computer program code for receiving depth resolved polarization dependant interferogram data of the axial depth scans (A-scans) of the cover glass 706.

Except for adding a balanced detection feature for reducing common mode noise, an additional embodiment 709B of the ultrahigh-resolution polarization-sensitive optical coherence tomography device shown in FIG. 7B has many similarities to the embodiment 709A of FIG. 7A, which was just discussed. To provide for balanced detection in the additional embodiment 709B of FIG. 7B, an additional non-polarizing beam splitter 712 B may be interposed between the source 710 of circularly polarized illumination pulses and the other non-polarizing beam splitter 712A, whose function was already discussed in detail previously herein with respect the similar embodiment 709A of FIG. 7A. The additional non-polarizing beam splitter 712B may optically couple portions of the reference pulses and signal pulses to an additional polarization sensitive beam splitter 718B, as depicted in FIG. 7B by a dashed line arrow extending there between.

The additional polarization sensitive beam splitter 718B may split the circularly polarized illumination pulses depending upon polarization thereof. Additional detectors 720B, 722B may be optically coupled to the additional polarization sensitive beam splitter 718B for detecting illumination pluses depending upon polarization thereof. Split polarizations of the illumination pulses are depicted by dashed line arrows extending from the additional polarization sensitive beam splitter 718B to the additional detectors 720B, 722B. Prior to any analog to digital conversion of any detector output, output of detector 720A may be balanced with output of additional detector 720B, and output of detector 722A may be balanced with output of additional detector 722B, for reducing common mode noise.

Turning now to discussion of additional embodiment 709C of the ultrahigh-resolution polarization-sensitive optical coherence tomography device shown in FIG. 7C, the foregoing may comprise source 711 of ultrashort linearly polarized illumination pulses, which may for purposes of simplicity of following discussion be deemed to provide vertical polarization reference relative to orientation arrangement of the remaining optical components of the additional embodiment 709C. The source 711 of ultrashort linearly polarized illumination pulses may be optically coupled with non-polarizing beam splitter 712A for splitting the ultrashort, linearly and vertically polarized illumination pulses into probe pulses and reference pulses. In FIG. 7C ultrashort linearly and vertically polarized illumination pulses from the source 711 are depicted by a dashed line arrow extending from the source 711 to the non-polarizing beam splitter 712A.

Axial depth scanning reference mirror 714 may be optically coupled to the non-polarizing beam splitter 712A for moveably reflecting received linearly polarized reference pulses back to the non-polarizing beam splitter 712A, as depicted by a dashed line double headed arrow extending between mirror 714 and splitter 712A. Piezoelectric actuation may be used for moving the axial depth scanning reference mirror 714 in the axial depth scans (A-scans), so as to obtain interferogram depth resolution (and corresponding depth resolution of the residual stress profile, which extends depthwise into the cover glass from the surface of the cover glass 706.)

As shown in FIG. 7C, the reference pulses may pass through a dispersion compensator 716 to reduce any pulse broadening. Further, as shown in FIG. 7C, an electric field vector of the reference pulses, which may be linearly polarized to have an initial vertical polarization, may pass twice through retarder 724 due to back-reflection by mirror 714. By such passing twice through retarder 724, retarder 724 may induce and then remove elliptical polarization. The linearly polarized electric field vector of the reference pulses may undergo an effective amount of rotation, upon passing twice through retarder 724. Such effective amount of rotation may be forty-five degrees relative to horizontal, so that linearly polarized reference pulses continuing through non-polarizing beam splitter 712A towards polarization sensitive beam splitter 718A may have equal powers of vertically polarized and horizontally polarized components.

Retarder 724 may be substantially characterized by a rotated Jones matrix, which may be a rotated Jones matrix of twenty-two-and-a-half degrees relative to horizontal. Retarder 724 may comprise a quarter-wave plate oriented with its fast axis at twenty-two-and-a-half degrees to the horizontal.

In contrast to retarder 724 and reference pulses just discussed, another retarder 726 may circularly polarize the previously mentioned linearly, vertically polarized probe pulses, which were split from the source 711 of linearly, vertically polarized illumination pulses by non-polarizing beam splitter 712A. Retarder 726 may comprise a quarter-wave plate, which may be arranged at a forty-five degree orientation with vertical, so as to provide a high degree of circular polarization to probe pulses, which may then be subsequently coupled through lens 717 to cover glass 706. In other words, cover glass 706, having the residual stress profile of the compression surface layer of the cover glass, may be optically coupled through retarder 726 and lens 717 to the non-polarizing beam splitter 712A for receiving the now circularly polarized probe pulses, which may have the high degree of circular polarization.

Signal pulses may be generated, and reflected back, by the residually stressed compression surface layer of the cover glass 706, in response to the circularly polarized probe pulses. Residual stress of the compression surface layer may induce photoelastic birefringence. Accordingly, reflected signal pulses may change polarization relative to the circular polarization of the probe pulses. As a general matter, the reflected signal pulses may become elliptically polarized to varying angles of ellipticity, in response to the foregoing photoelastic birefringence. Moreover, as a general matter, the reflected signal pulses are elliptically polarized to varying angles of ellipticity, as they are back-reflected through lens 717 and retarder 726 to non-polarizing beam splitter 712A.

In FIG. 7C the probe pulses and responsive signal pulses are depicted by a dashed line double headed arrow extending between the splitter 712A and the cover glass 706, wherein a direction of a first one of the arrow heads illustrates the probe pulses from the splitter 712A to the cover glass, and wherein a return direction of the other one of the arrow heads illustrates the responsive signal pulses.

A polarization sensitive beam splitter 718A may be optically coupled to the non-polarizing beam splitter 712A for receiving the reference pulses and signal pulses from non-polarizing beam splitter 712A, as depicted by a dashed line arrow extending from the non-polarizing beam splitter 712A to the polarization sensitive beam splitter 718A. It may be particularly noted that the reference pulses received by the polarization sensitive beam splitter 718A may be linearly polarized and rotated by forty-five degrees relative to horizontal, so that the linearly polarized reference pulses received by the polarization sensitive beam splitter 718A may have equal powers of vertically polarized and horizontally polarized components.

The polarization sensitive beam splitter 718A may split the reference pulses and the signal pulses depending upon polarization thereof. Detectors 720A, 722A may be optically coupled to the polarization sensitive beam splitter 718A for detecting depth resolved interferograms of the reference pulses and signal pulses depending upon polarization thereof. Split polarizations of the reference pulses and the signal pulses are depicted by dashed line arrows extending from the polarization sensitive beam splitter 718A to the detectors 720A, 722A.

Analog to digital converters associated with the detectors 720A, 722A may generate depth resolved polarization dependant interferogram data from detection of the depth resolved polarization dependant interferograms. As mentioned previously herein, the ultrahigh-resolution polarization-sensitive optical coherence tomography device 709C may be coupled to computer 708, which may execute suitable computer program code for receiving depth resolved polarization dependant interferogram data of the axial depth scans (A-scans) of the cover glass 706.

Except for adding balanced detection for reducing common mode noise, another additional embodiment 709D of the ultrahigh-resolution polarization-sensitive optical coherence tomography device shown in FIG. 7D has many similarities to the embodiment 709C of FIG. 7C, which was just discussed. To provide for balanced detection in the additional embodiment 709D of FIG. 7D, an additional non-polarizing beam splitter 712 D may be interposed between polarization sensitive beam splitter 718A and the other non-polarizing beam splitter 712A, whose function was already discussed in detail previously herein with respect the similar embodiment 709C of FIG. 7C. The additional non-polarizing beam splitter 712D may optically couple portions of the reference pulses and signal pulses to an additional polarization sensitive beam splitter 718D, as depicted in FIG. 7D by a dashed line arrow extending there between.

The additional polarization sensitive beam splitter 718D may split the coupled portions of the reference pulses and signal pulses depending upon polarization thereof. Additional detectors 720D, 722D may be optically coupled to the additional polarization sensitive beam splitter 718D for detection depending upon polarization. Split polarizations the portions of the reference pulses and signal pulses are depicted by dashed line arrows extending from the additional polarization sensitive beam splitter 718D to the additional detectors 720D, 722D. Prior to any analog to digital conversion of any detector output, output of detector 720A may be balanced with output of additional detector 720D, and output of detector 722A may be balanced with output of additional detector 722D, for reducing common mode noise.

Further, it should be understood that although a time domain optical coherence tomography device is shown in the embodiments of FIGS. 7A-D, other embodiments may use other domains for optical coherence tomography. For example, such other embodiments may use fourier domain optical coherence tomography, which may not require reference mirror movement to obtain depth resolved interferogram information (and corresponding depth resolved information of the residual stress profile, which extends depthwise into the cover glass from the surface of the cover glass.) Further, spectral separation may play a role in alternative detection schemes, such as use of suitable spectrometers, or swept frequency sources.

Figure 8:
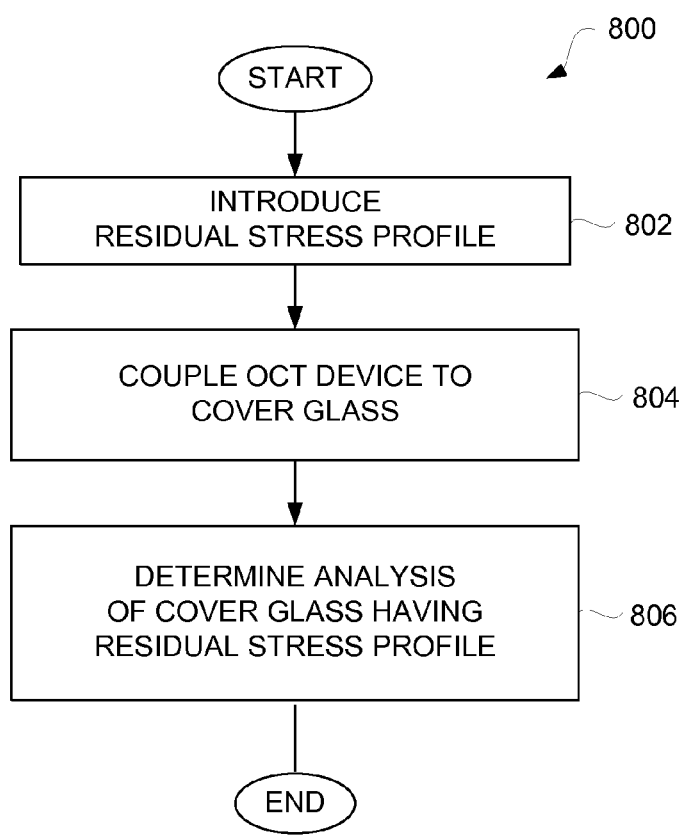
FIG. 8 is a flow diagram of a process for optical coherence tomography analysis according to one embodiment.

FIG. 8 is a flow diagram of a process 800 for optical coherence tomography analysis according to one embodiment. The process 800 may begin with introducing 802 a residual stress profile within a cover glass. This may comprise chemically strengthening and/or chemically toughening the cover glass as discussed previously herein. The process 800 may continue with optically coupling 804 an optical coherence tomography device to the cover glass having the residual stress profile within the cover glass. The optical coherence tomography device may comprise: a polarization-sensitive optical coherence tomography device; an ultrahigh-resolution optical coherence tomography device; or a time domain optical coherence tomography device.

The process 800 may continue with determining 806 an analysis of the cover glass having the residual stress profile. Such analysis may be determined quickly so as to provide for efficiency in manufacturing of the cover glass. Accordingly, the determining may comprise determining the analysis of the cover glass in substantially less than approximately fifteen seconds.

Further, to provide detailed and accurate analysis of the residual stress profile of the compression surface layer of the cover glass, the determining 800 may comprise determining the analysis of the cover glass with a depth resolution extending into the cover glass of about one micron or finer, and/or determining the analysis of the cover glass with a stress resolution of about one Mega-Pascal or finer. Once the analysis has been determined, the process 800 shown in FIG. 8 can then end.

Figure 9:
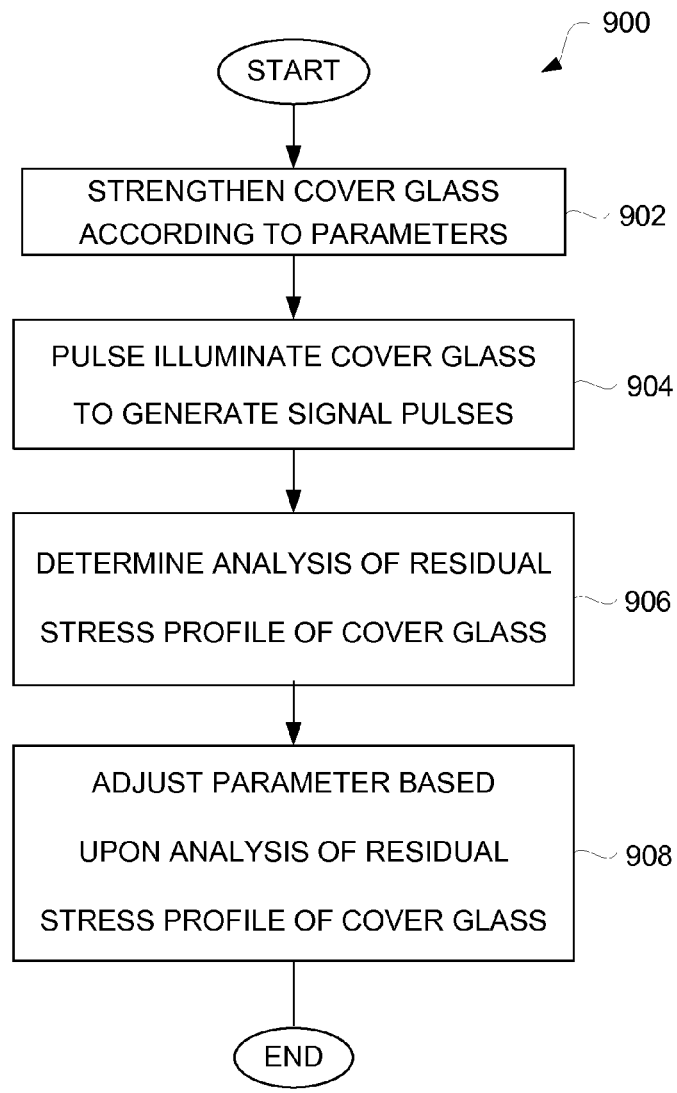
FIG. 9 is a flow diagram of a process for controlling parameters of chemical processing for strengthening cover glass, according to one embodiment.

The foregoing detail and accuracy of the analysis of the residual stress profile may be used to particular advantage in a process 900 for controlling parameters of chemical processing for strengthening cover glass, as illustrated in FIG. 9. The process 900 may begin with strengthening 902 cover glass using a chemical process according to a first set of parameters, so as to introduce a residual stress profile within the cover glass. Examples of such parameters have already been discussed in detail previously herein.

The process 900 may continue with pulse illuminating 904 the cover glass to generate signal pulses from the cover glass. The process 900 may continue with determining 906 from the signal pulses an analysis of the residual stress profile of the cover glass. The process 900 may continue with adjusting 908 at least one member of the set parameters of the chemical process based upon the analysis of the residual stress profile of the cover glass. Once the one or more parameters have been adjusted, the process 900 can then end.

Some embodiments may utilize software together with hardware. Such software may be embodied as computer readable code on a non-transitory computer readable medium. The non-transitory computer readable medium is any data storage device that can store data which can thereafter be read by a computing device, such as computer system. Examples of the non-transitory computer readable medium include read-only memory, random-access memory, CD-ROMs, DVDs, magnetic tape, and optical data storage devices.

The advantages of the invention are numerous. Different aspects, embodiments or implementations may yield one or more of the following advantages. One advantage of the invention may be that optical coherence tomography analysis may reveal fine details of the residual stress profile within chemically strengthened cover glass. Another advantage may be that optical coherence tomography may determine analysis of the modified residual stress profile within double ion exchanged glass of the cover glass, which may be substantially non-monotonic. Another advantage may be that analysis of such non-monotonic stress profiles may be determined non-destructively using optical coherence tomography. Another advantage may be that one or more parameters of chemical strengthening treatments may be adjusted, based upon the analysis of the residual stress profile. Another advantage may be that strengthening treatments may be improved. Another advantage may be that cover glass may be made even thinner while maintaining adequate strength. Another advantage may be that optical coherence tomography analysis be done quickly and non-destructively. Another advantage may be that optical coherence tomography analysis may promote uniform high quality in manufacturing chemically strengthened cover glass.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. An apparatus comprising:
a polarimetric optical coherence tomography device configured to use ultrashort polarized probe pulses to analyze with depth resolution of about one micron or finer a cover glass having a residual stress depth profile;
a fixture configured to align the cover glass in an optical coupling with the ultrashort polarized probe pulses of the polarimetric optical coherence tomography device, wherein the polarimetric optical coherence tomography device comprises a time domain polarimetric optical coherence tomography device configured to analyze with depth resolution of about one micron or finer the residual stress depth profile of the cover glass; and
a chemical processing bath having parameters that are adjustable based upon depth resolved analysis of the residual stress depth profile of the cover glass.

2. An apparatus as in claim 1 wherein:
a housing for a consumer electronic device is attached to the cover glass and electrical components of the consumer electronic device are provided at least partially internal to said housing; and
the fixture is configured to couple to the housing and to align the cover glass in the optical coupling with the polarimetric optical coherence tomography device.

3. An apparatus as recited in claim 2, wherein:
said consumer electronic device is a cell phone, a portable media player, a personal digital assistant, or a remote control device; and
the fixture is configured to couple to at least one of the cell phone, the portable media player, the personal digital assistant, or the remote control device and to align the cover glass in the optical coupling with the polarimetric optical coherence tomography device.

4. An apparatus as in claim 1 wherein the polarimetric optical coherence tomography device is configured to receive signal pulses from the cover glass in response to the ultrashort polarized probe pulses.

5. An apparatus as in claim 1 wherein the chemical processing bath comprises a chemical strengthening bath having parameters that are adjustable based upon depth resolved analysis of the residual stress depth profile of the cover glass.

6. An apparatus as in claim 1 wherein:
the cover glass comprises double ion exchanged glass; and
the polarimetric optical coherence tomography device is configured to analyze the residual stress depth profile of the double ion exchanged glass of the cover glass.

7. An apparatus as in claim 1 wherein:
the residual stress depth profile of the cover glass is comprises a substantially non-monotonic residual stress depth profile; and
the polarimetric optical coherence tomography device is configured to analyze with depth resolution the substantially non-monotonic residual stress depth profile of the cover glass.

8. An apparatus as in claim 1 wherein:
the residual stress depth profile comprises an increasing compression stress profile extending inwardly from surfaces of the cover glass, for arresting cracks as the cracks attempt to propagate from the surfaces of the cover glass, deeper into the cover glass; and
the polarimetric optical coherence tomography device is configured to analyze with depth resolution the increasing compression stress profile extending inwardly from surfaces of the cover glass.

9. An apparatus as in claim 1 wherein:
the residual stress depth profile comprises a compression stress profile having a submerged peak below a surface of the cover glass; and
the polarimetric optical coherence tomography device is configured to analyze with depth resolution the compression stress profile having the submerged peak below the surface of the cover glass.

10. An apparatus as in claim 1 wherein:
the residual stress depth profile comprises an increasing compression stress profile extending inwardly from a surface of the cover glass to a submerged compression stress peak, and further comprises a decreasing compression stress profile extending from the submerged compression stress peak to a central region of the cover glass;
the polarimetric optical coherence tomography device is configured to analyze with depth resolution the increasing compression stress profile extending inwardly from the surface of the cover glass to the submerged compression stress peak; and
the polarimetric optical coherence tomography device is configured to analyze with depth resolution the decreasing compression stress profile extending from the submerged compression stress peak to a central region of the cover glass.

11. An apparatus as in claim 1 wherein:
the residual stress depth profile comprises a compression stress profile having a submerged profile peak at a depth below a surface of the cover glass, and the depth of the submerged profile peak is substantially within a range of approximately ten to thirty microns; and
the polarimetric optical coherence tomography device is configured to analyze with depth resolution the submerged profile peak substantially within the range of approximately ten to thirty microns.

12. A method for depth resolved stress profile analysis comprising:
optically coupling a time domain optical coherence tomography device to a cover glass having a stress depth profile within the cover glass; and
determining depth resolved analysis of the stress depth profile of the cover glass.

13. A method as recited in claim 12 further comprising introducing the stress depth profile into the cover glass.

14. A method as recited in claim 12 further comprising chemically strengthening the cover glass to introduce the stress depth profile into the cover glass.

15. A method as in claim 12 wherein the time domain optical coherence tomography device comprises a time domain polarimetric optical coherence tomography device.

16. A method as in claim 12 further comprising adjusting at least one member of a set parameters of a chemical strengthening process based upon the depth resolved analysis of the stress depth profile of the cover glass.

17. A method as recited in claim 12 wherein the determining comprises determining the depth resolved analysis of the stress depth profile of the cover glass in substantially less than approximately fifteen seconds.

18. A method as recited in claim 12 wherein the determining comprises determining the depth resolved analysis of the stress depth profile of the cover glass with a depth resolution extending into the cover glass of about one micron or finer.

19. A method as recited in claim 12 wherein the determining comprises determining the depth resolved analysis of the stress depth profile of the cover glass with a stress resolution of about one Mega-Pascal or finer.

20. A non-transitory computer readable medium including at least computer program code stored thereon for depth resolved stress profile analysis of a cover glass having a stress depth profile within the cover glass, said computer readable medium comprising:

- computer program code for receiving depth resolved polarization dependent time domain interferogram data from detectors optically coupled to the cover glass; and
- computer program code for determining a depth resolved analysis of the stress depth profile of the cover glass.

21. A non-transitory computer readable medium as recited in claim 20 further comprising:

- computer program code for generating birefringent phase retardation data from the depth resolved polarization dependent time domain interferogram data; and
- computer program code for analyzing the birefringent phase retardation data.

22. A method for controlling parameters of chemical processing for strengthening cover glass using depth resolved stress profile analysis comprising:

- strengthening cover glass using a chemical strengthening process according to a first set of parameters, so as to introduce a stress profile within the cover glass;
- pulse illuminating the cover glass to generate signal pulses from the cover glass;
- determining from the signal pulses a depth resolved analysis of the stress profile of the cover glass; and
- adjusting at least one member of the set parameters of the chemical strengthening process based upon the depth resolved analysis of the stress profile of the cover glass.

23. An apparatus for depth resolved stress profile analysis comprising:

- A source of ultrashort illumination pulses;
- a splitter for splitting the ultrashort illumination pulses into probe pulses and reference pulses;
- a cover glass having a stress depth profile within the cover glass, wherein the cover glass is optically coupled to the splitter for receiving the probe pulses and for generating signal pulses in response to the probe pulses;
- a polarization splitter configured to split the reference pulses and the signal pulses depending upon polarization thereof; and
- a time domain analyzer configured to determine a depth resolved analysis of the stress depth profile of the cover glass based upon the reference pulses and signal pulses.

* * * * *